United States Patent [19]

Stone

[11] Patent Number: 5,282,114
[45] Date of Patent: Jan. 25, 1994

[54] RUGGEDIZED COMPUTER ASSEMBLY PROVIDING ACCESSIBILITY AND ADAPTABILITY TO, AND EFFECTIVE COOLING OF, ELECTRONIC COMPONENTS

[75] Inventor: Robert J. Stone, Boulder, Colo.

[73] Assignee: Codar Technology Inc., Longmont, Colo.

[21] Appl. No.: 788,044

[22] Filed: Nov. 5, 1991

[51] Int. Cl.⁵ .......................... H05K 5/02; H05K 7/20
[52] U.S. Cl. ..................... 361/687; 361/695
[58] Field of Search .............. 211/26; 248/568; 312/282, 314, 316, 107, 111; 361/340, 384, 390, 391, 380, 395, 415, 429

[56] References Cited

U.S. PATENT DOCUMENTS

| | | | |
|---|---|---|---|
| 214,271 | 4/1879 | Zündorff | 312/282 X |
| 3,147,404 | 9/1964 | Sinner | 361/390 X |
| 3,188,524 | 6/1965 | Williams | 361/390 |
| 3,204,913 | 9/1965 | Lawrence et al. | 248/568 X |
| 3,378,320 | 4/1968 | Morgan et al. | 312/111 X |
| 3,675,084 | 7/1972 | Jammaud | 361/390 |
| 3,679,829 | 7/1972 | Hofmeister et al. | 361/390 X |
| 3,683,238 | 8/1972 | Olds et al. | 361/390 X |
| 3,689,128 | 9/1972 | Andreni et al. | 361/390 X |
| 4,002,955 | 1/1977 | Eggert et al. | 361/391 |
| 4,316,236 | 2/1982 | Lechner et al. | 361/429 |
| 4,699,270 | 10/1987 | Bohm | 312/107 X |
| 4,728,160 | 3/1988 | Mondor et al. | 361/384 X |
| 4,758,923 | 7/1988 | Tanaka et al. | 361/391 X |
| 4,758,924 | 7/1988 | Dillon et al. | 361/384 X |
| 4,805,906 | 2/1989 | Wiczer et al. | 312/282 X |
| 4,985,804 | 1/1991 | Campbell et al. | 361/384 |
| 5,001,602 | 3/1991 | Suffi et al. | 361/390 |
| 5,097,386 | 3/1992 | Byell et al. | 361/391 X |

FOREIGN PATENT DOCUMENTS

1230475 12/1966 Fed. Rep. of Germany ...... 361/399

OTHER PUBLICATIONS

IBM Technical Disclosure Bulletin, vol. 22, No. 1, Jun. 1989, pp. 240 and 241, "Micro-Modular Air-Cooling Scoop", R. E. Simons.

Primary Examiner—Harold Broome
Assistant Examiner—Michael W. Phillips
Attorney, Agent, or Firm—Duft, Graziano & Forest

[57] ABSTRACT

A rectangular housing has an electronics mounting frame shock mounted in it. The frame includes a plate and two angle members extending parallelly on opposite ends of the plate. A tray holding a controller electronics circuit board is suspended from the angles with knurled screws that can be hand fastened. A processor tray holds a processor circuit board. Spring-loaded plungers on one end of the processor tray attach the tray to flanges on the end of the plate distal from the controller tray. Hand-operable fasteners attach the other end of the processor tray to the angles overlying the controller tray. With these fasteners unscrewed, the processor tray may be pivoted upward, and a rod attached to one angle raised to stably support it, thus permitting access to the controller circuit. The controller tray may also be stably supported on top of the angles to provide access to a modular power supply beneath it. A rectangular frame extends the housing by one RETMA unit. One end of a flexible baffle is attached to the housing and the other end lies against the frame forcing air over the electronics, without transmitting housing shocks to the frame.

14 Claims, 17 Drawing Sheets

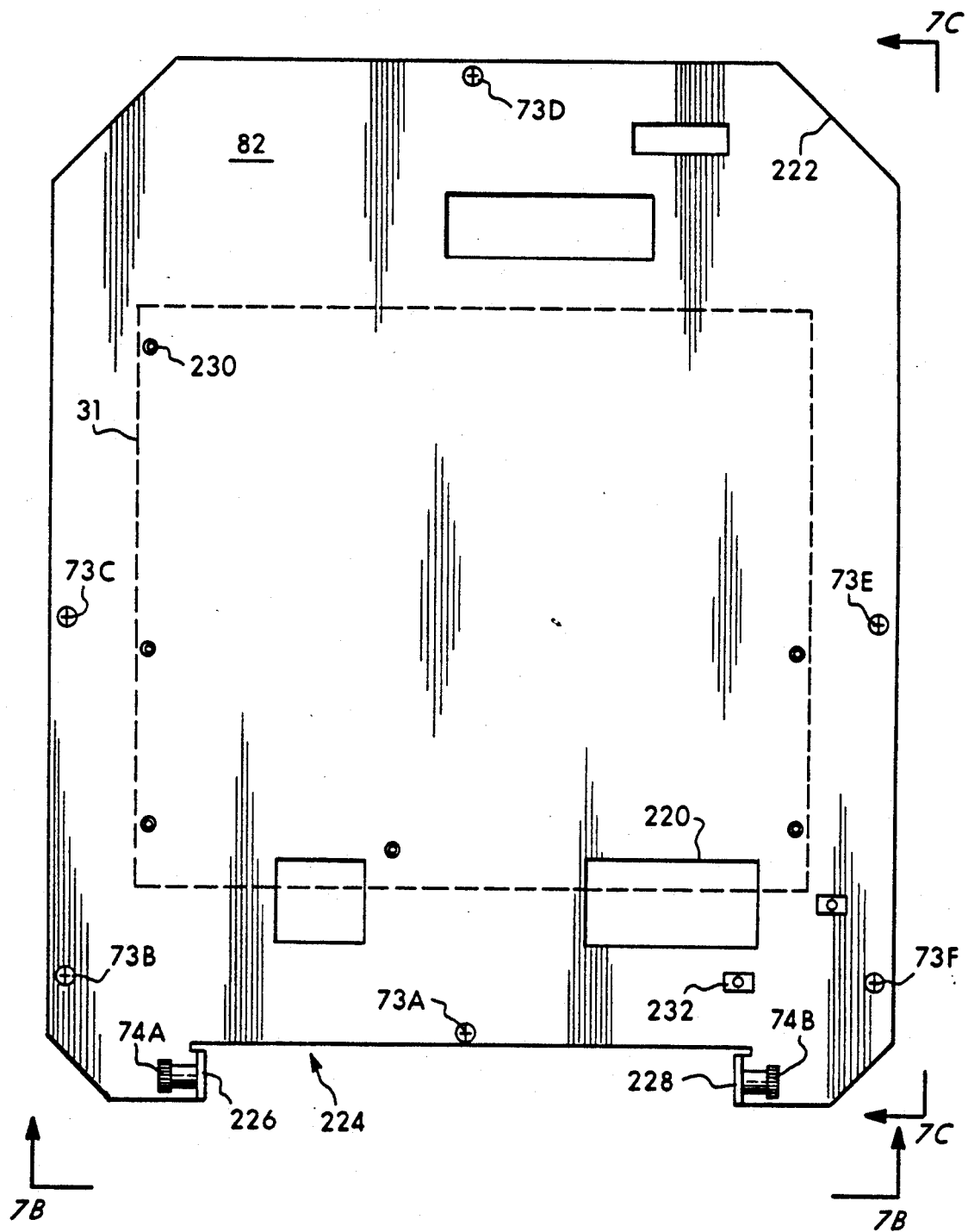

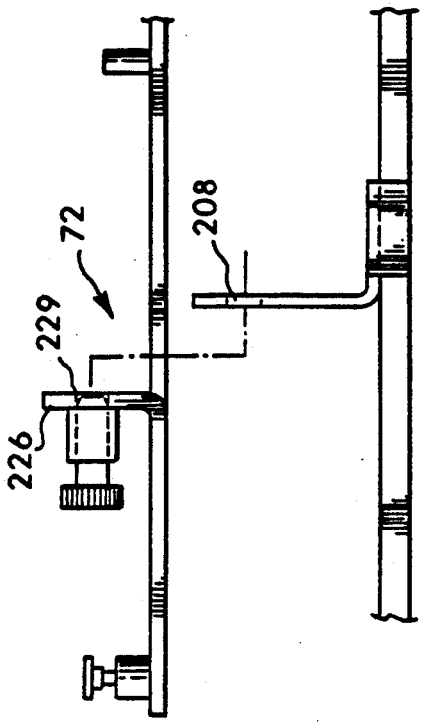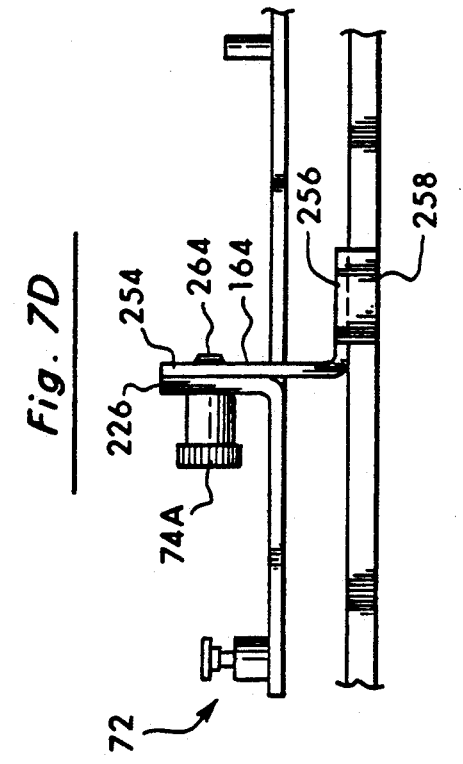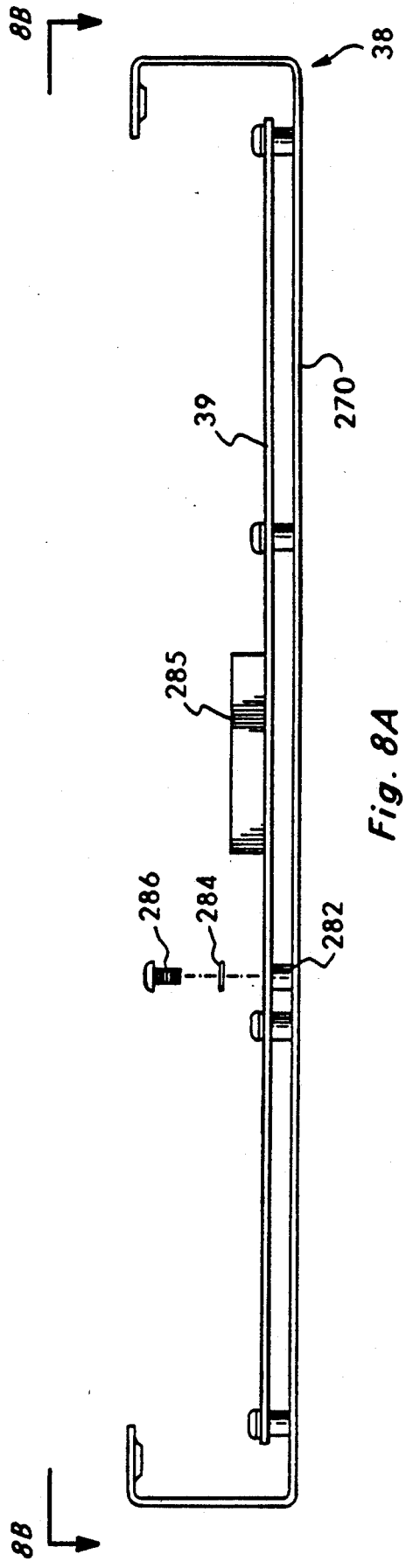

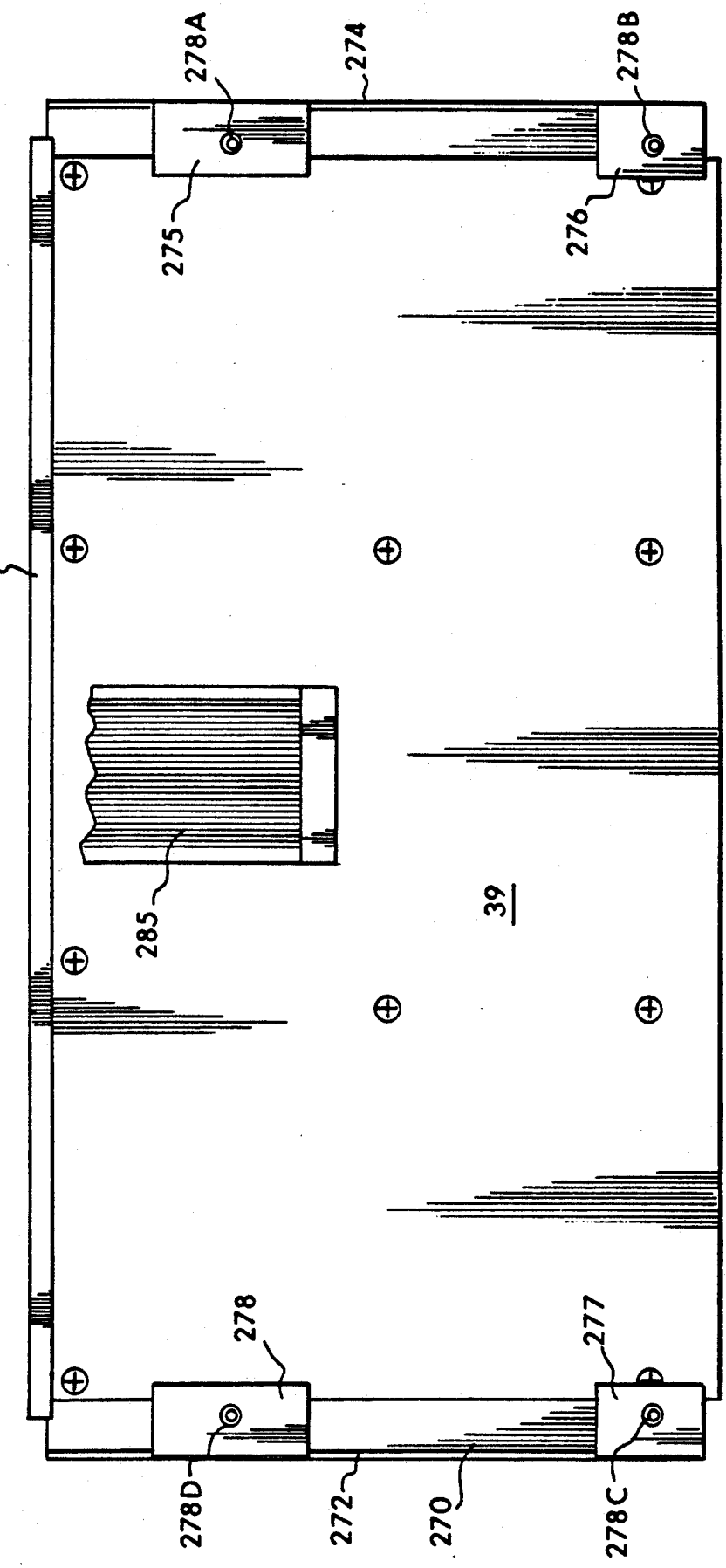

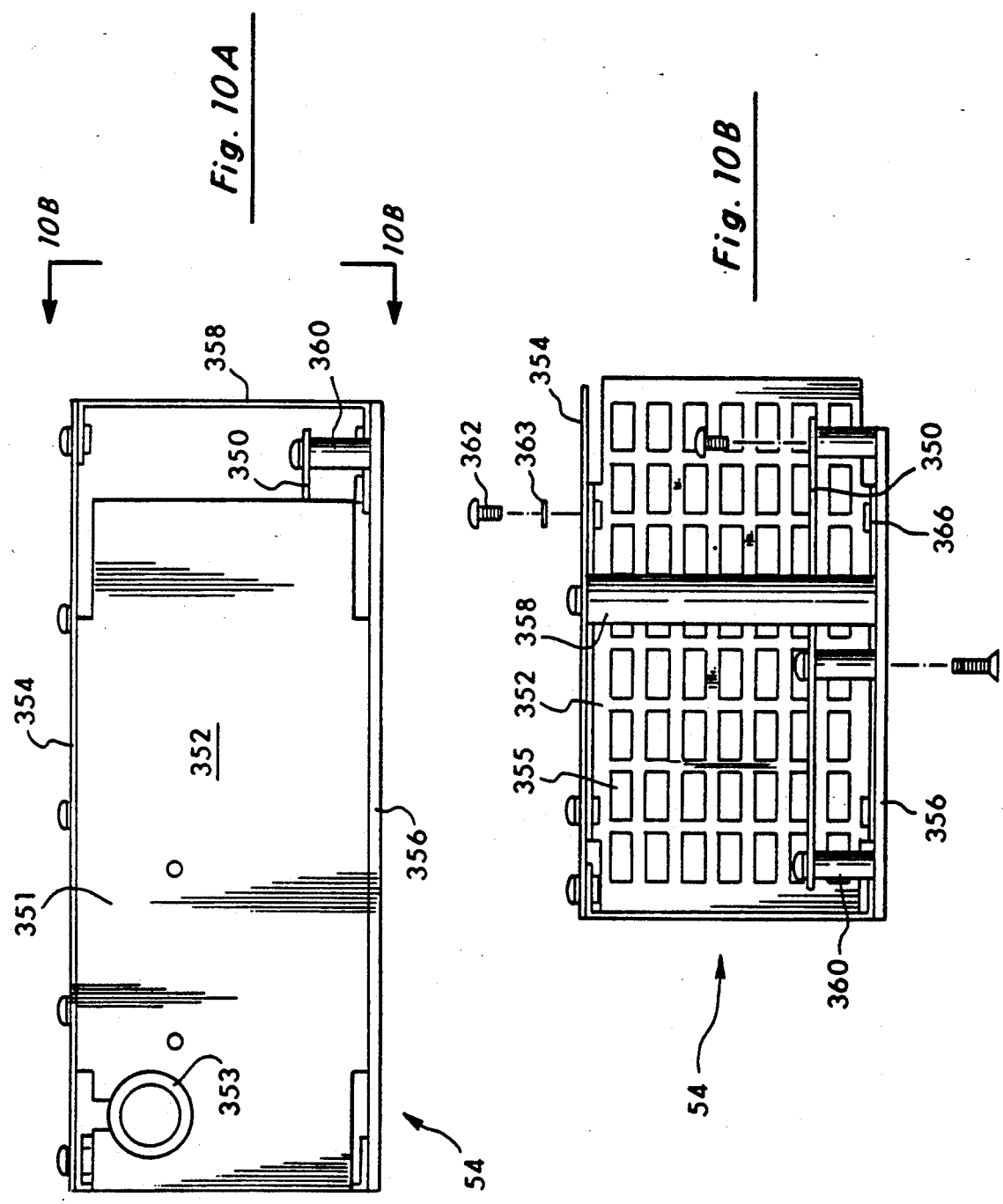

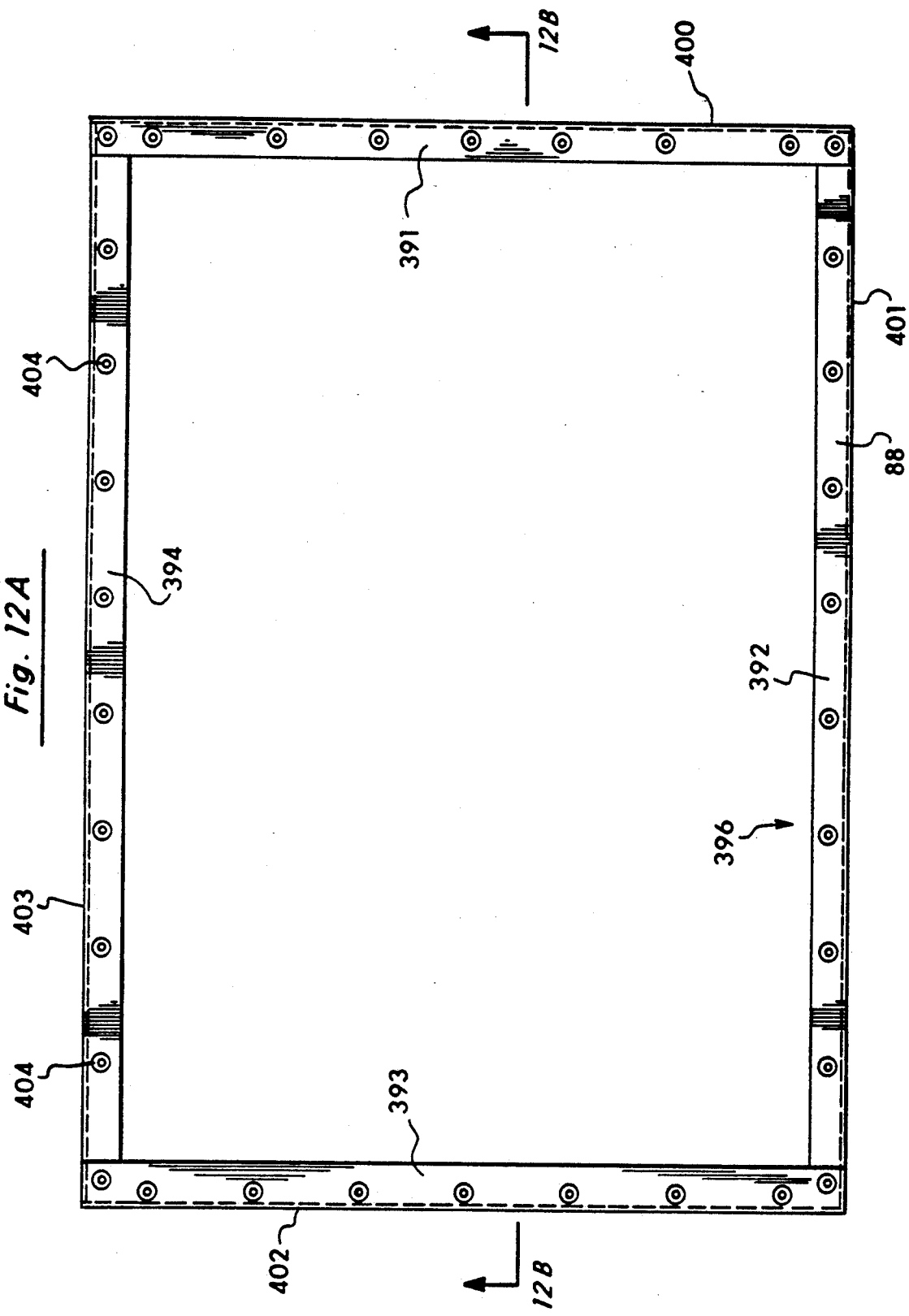

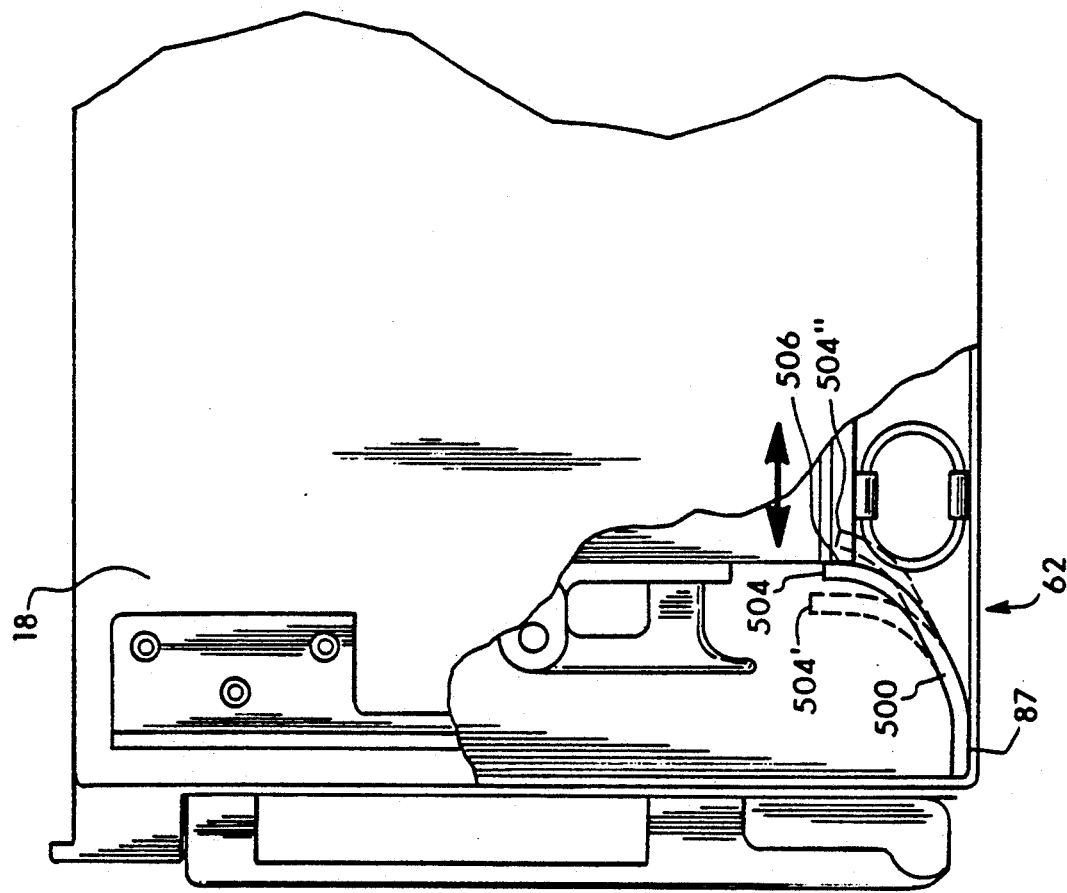

RUGGEDIZED COMPUTER ASSEMBLY PROVIDING ACCESSIBILITY AND ADAPTABILITY TO, AND EFFECTIVE COOLING OF, ELECTRONIC COMPONENTS

BACKGROUND OF THE INVENTION

1. Field of the Invention

The invention in general relates to ruggedized computers and more particularly to such a computer having a housing that provides accessibility and adaptability to a wide variety of electronic components, and which directs cooling air to these components without transmission of shock.

2. Statement of the Problem

Ruggedized microcomputers are computers that have been specially designed to protect the electronic parts of the computer in hostile environments, such as on the battle field. Generally computers are maintained in controlled environments of "computer rooms" where temperature, humidity, vibration, etc. are closely controlled. This fact indicates the difficulty of designing computers that will operate in the extreme conditions of shock, vibration, temperature and humidity that can exist in the field.

Prior approaches to designing ruggedized microcomputers have included the mounting of the electronic components in strong frames, and the suspension of these frames within the computer housing on shock isolation mechanisms to prevent shocks to the housing from being transmitted to the electronic components. See U.S. Pat. No. 4,985,804 issued to W. Carroll Campbell et al. It has generally been the practice in ruggedized computers to strengthen all housing parts. For example, in ruggedized computers the relatively flexible circuit boards generally are mounted on rigid metal plates. This prevents flexing of the circuit boards which can lead to deterioration. At the same time, ruggedized computers are also as compact as possible to allow them to be more easily moved in the field. The combination of more complex, stronger housing structures with compactness has led to relative inaccessibility of components in ruggedized computers, even though accessibility and ease of repair of components is more important in these computers, as they may need to be serviced in hostile environments, such as war. Thus it would be highly desirable to have a ruggedized computer with a housing that has all the advantages of ruggedization yet provides ease of accessibility and repair of the electronic components.

The complex housings of ruggedized microcomputers are more expensive to build than the housings of other microcomputers. In addition, customers of ruggedized computers have many specialized needs, and thus they may specify any of a wide variety of processors and other components, for example anything from a PC processor to a Sun TM to a VAX TM processor. This combination of requirements has made it quite expensive to design, manufacture and store a supply of housings that will meet all customer needs. A ruggedized computer that retains the advantages of such computers and yet can accommodate a wide variety of electronic components would be a significant advance over the prior art.

The suspension of the electronics in positions away from the housing walls in ruggedized microcomputers necessarily creates gaps between the electronics and the walls. Thus, cooling air in such microcomputers tends to flow in these gaps rather than over the electronic parts. For this reason prior approaches to controlling the temperature environment in ruggedized microcomputers have used large fans with essentially straight-line flow structures plus the use of specialized smaller fans to cool specific components. See U.S. Pat. No. 4,985,804, referred to above. These solutions have added more complexity and constraints on the placement of internal components in ruggedized microcomputers that have further decreased the accessibility, lowered the adaptability to a variety of components, and increased the expense of building such computers. Thus a need exists for a simpler way of cooling while still providing the other advantages of ruggedized computers, such as shock isolation.

3. Solution to the problem:

The present invention provides a ruggedized microcomputer in which electronic units, such as circuit boards, can be moved from normal positions in which the block access to other components to service positions in which the other components are accessible and can be serviced.

The invention provides an apparatus for stably supporting the electronics units in the service positions, apparatus for electrical connection of the electronic units in the service positions, and apparatus which facilitates the moving of the units by hand.

The present invention provides an electronics tray which can accommodate a wide variety of processor units, which tray can be attached or released from the microcomputer by hand.

Additionally the invention provides a ruggedized computer housing extension that can be easily inserted in the manufacturing process to allow the microcomputer to accommodate a wide variety of processors requiring different headroom The invention also provides a baffle that directs air flow to the electronics in an electronics assembly, without transmitting housing shocks to the various electronic assemblies it must contact in order to effectively direct such air flow.

The combination of the aspects of the invention listed above work together to provide a ruggedized microcomputer with unusual accessibility, adaptability, compactness, and durability. The ability to move electronics to service positions and to stably support them clearly creates greater accessibility, but also permits the units to be located more compactly in their normal positions since they can be moved when necessary. The electronics tray that can accommodate a variety of processors and is easily releasable clearly increases accessibility and adaptability, but also increases compactness for the reason given above and durability because sensitive electronics parts are less likely to be damaged when adjustments or repairs are made to the computer. The extension clearly increases adaptability and accessibility, but also means that microcomputers without the extension can be more compact since the extension is available, and increases durability because electronics is less likely to be crammed into too small of a housing. The baffle that does not transmit shock clearly adds to the durability because it directs air to where it can cool most effectively, but it also increases accessibility and adaptability because it can be easily moved to provide access to and adapt to other parts, and permits increased compactness because more effective cooling is available.

SUMMARY OF THE INVENTION

The invention provides a ruggedized microcomputer system comprising: a housing; a power source; a first electronic unit and a second electronic unit contained in the housing; shock isolating means for isolating the first and second electronic units from mechanical shocks to the housing; first electronic unit support means for permitting the first electronic unit to be moved from a first position where it blocks the accessibility of the second unit to a second position where the second unit is accessible and for stably supporting the first unit in the first and second positions; electrical connecting means for electrically connecting said electronic units to said power source in said first and second positions; and the support means further including release means for attaching and releasing the first electronic unit from the housing by hand. Preferably, the first electronic unit support means comprises a frame; the release means comprises means for releasably attaching the first electronic unit to the frame; and the shock isolating means comprises shock absorbing means for attaching the frame to the housing. Preferably, the first electronic unit support means comprises a rod means for supporting the first electronic unit in the second position. Preferably, the rod means comprises: means for pivotally attaching one end of the rod to the housing permitting it to move from a down position in which it is trapped between the first electronic unit and the frame and an up position in which it supports the first electronic unit in the second position; and locking means for locking the rod in the up position. Preferably, the release means comprises a spring-loaded plunger. Preferably, the support means further comprises: receptacle means for pivotally receiving the plunger, the receptacle means and plunger located at or near one portion of the first electronic unit; and the release means further comprises means for attaching another portion of the first electronic unit to the frame by hand. Preferably, the second electronic unit comprises a circuit board and the ruggedized microcomputer further comprises: a second unit support member that is relatively rigid as compared to the circuit board; means for securely fastening the circuit board to the second unit support member; means for releasably fastening the second unit support member to the frame; and wherein the means for releasably fastening is easily accessible when the first unit is in the second position. Preferably, the first electronic unit support means further comprises electronic unit mounting means for permitting various electronic units of different sizes and manufacturing origins to be mounted in the housing, and the electronic unit is mounted on the mounting means. Preferably, the ruggedized microcomputer further comprises: fan means for moving air through the housing; baffle means adjacent one of the first and second electronic units for directing the air, the baffle means being sufficiently rigid to perform its directing function and sufficiently flexible to permit ease of accessibility to and replacement of the adjacent electronic unit.

In another aspect the invention provides a ruggedized microcomputer system comprising: a housing: electronic unit mounting means for permitting a various electronic units of different sizes to be mounted in the housing; an electronic unit mounted on the mounting means; shock isolating means for isolating the electronic unit from shocks to the housing; housing extension means for extending the housing adjacent the electronic unit so that electronic units requiring head rooms greater than that permitted by the housing alone can be mounted on the mounting means and enclosed within the housing and housing extension means. Preferably, the housing is of a size that meets Radio Electronics Television Manufacturing Association (RETMA) standards for mounting in equipment racks and the extension means increases the housing size by one RETMA height. Preferably, the mounting means comprises a rigid member adapted for holding electronic units of different manufacturing origins. Preferably, the ruggedized microcomputer further comprises a modular power supply comprising a filter unit, a rectifier unit, and a dc to dc converter unit.

In still another aspect the invention provides a ruggedized microcomputer comprising: a housing; an electronic assembly in the housing; shock isolating means for supporting the electronic assembly within the housing while isolating the assembly from shocks to the housing; fan means for moving air through the housing; baffle means for directing the air; and means for mounting the baffle means in the housing in contact with the electronic assembly without transmitting shocks from the housing to the electronic assembly. Preferably, the baffle means comprises a member that is sufficiently flexible to contact both the housing and the electronic assembly without transmission of shocks from the housing to the electronic assembly Preferably, the baffle means loosely contacts one of the housing or the electronic assembly. Preferably, the baffle means is attached to the other of the housing and the electronic assembly.

The invention provides a ruggedized microcomputer having a housing that provides for rapid access and repair in the field, can be easily adapted for a wide variety of processors, and, contrary to expectations, at the same time is even more durable and immune to shocks than prior art ruggedized microcomputers. It is also more easily manufactured Numerous other features, objects and advantages of the invention will become apparent from the following description when read in conjunction with the accompanying drawings.

BRIEF DESCRIPTION OF THE DRAWINGS

FIG. 7A is a top view of the processor tray of the embodiment of FIG. 2, with the position of the processor circuit board shown in ghost;

FIGS. 7D and 7E show a detail of the release mechanism of the processor tray attached (FIG. 7D) and released (FIG. 7E) from the mounting frame;

FIG. 8A is a front view of the system controller electronic unit of the system of FIG. 1 viewed in the direction Of lines 8A—8A in FIG. 4;

FIG. 8B is a top view of the system controller electronics unit of FIG. 8A taken in the direction of lines 8B—8B in FIG. 8A;

FIG. 10 A is a side view of the power rectification module of the microcomputer of FIG. 1;

FIG. 10 B is a rear view of the power rectification module taken in the direction of lines 10B—10B of FIG. 10A;

FIG. 12A is a top view of the a housing extension to extend the housing of the microcomputer of FIG. 1;

FIG. 13B is a partially cut away partial side view of the microcomputer of FIG. 1 illustrating in ghost exemplary movement of the baffle of FIG. 13A in following a movement of the electronics assembly with respect to the housing as shown by the arrow.

DESCRIPTION OF THE PREFERRED EMBODIMENT

Overview.

Figure 1:
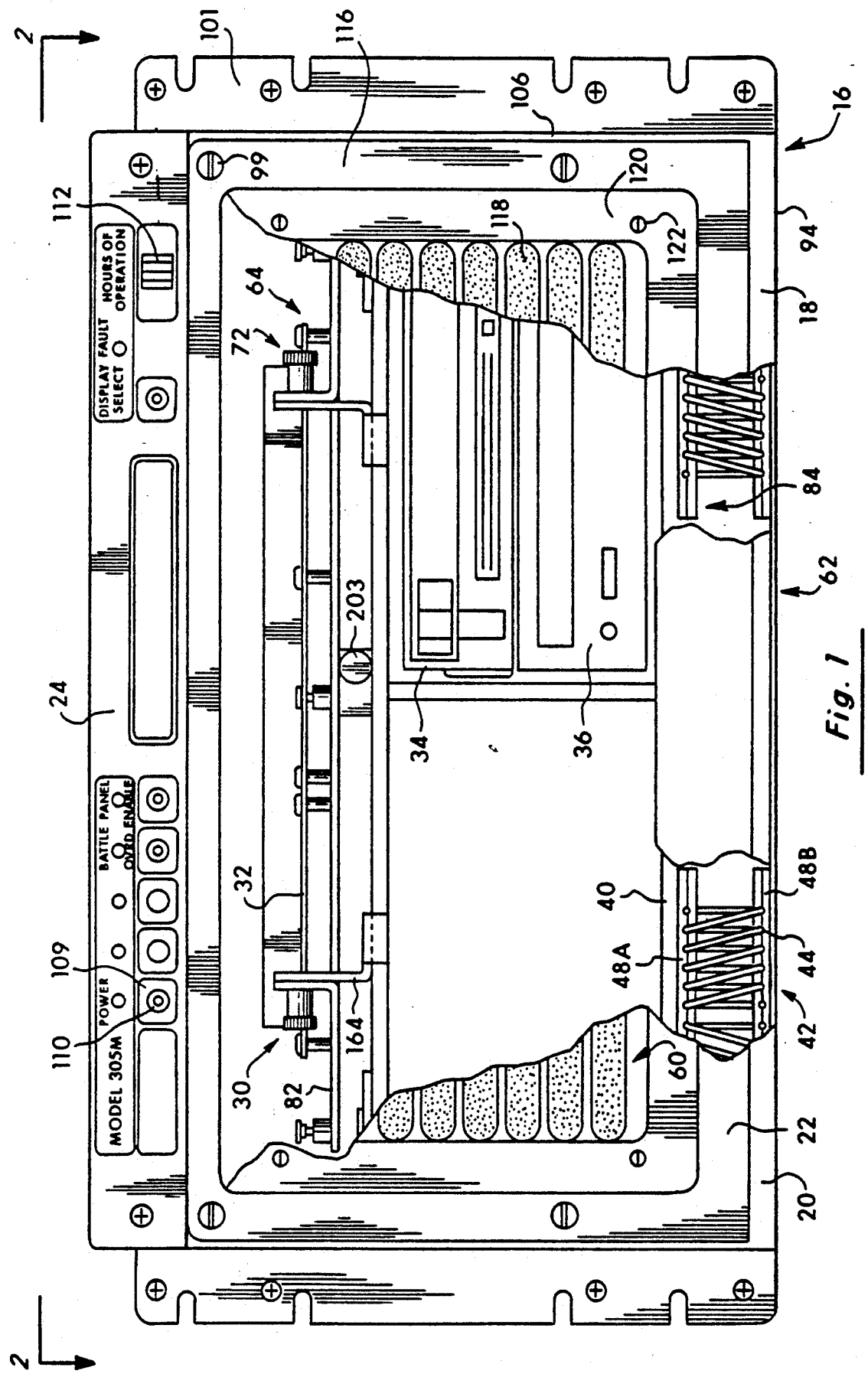
FIG. 1 is a front view of an exemplary ruggedized microcomputer according to the invention, with the housing partially cut away to show the arrangement of internal components.
Figure 2:
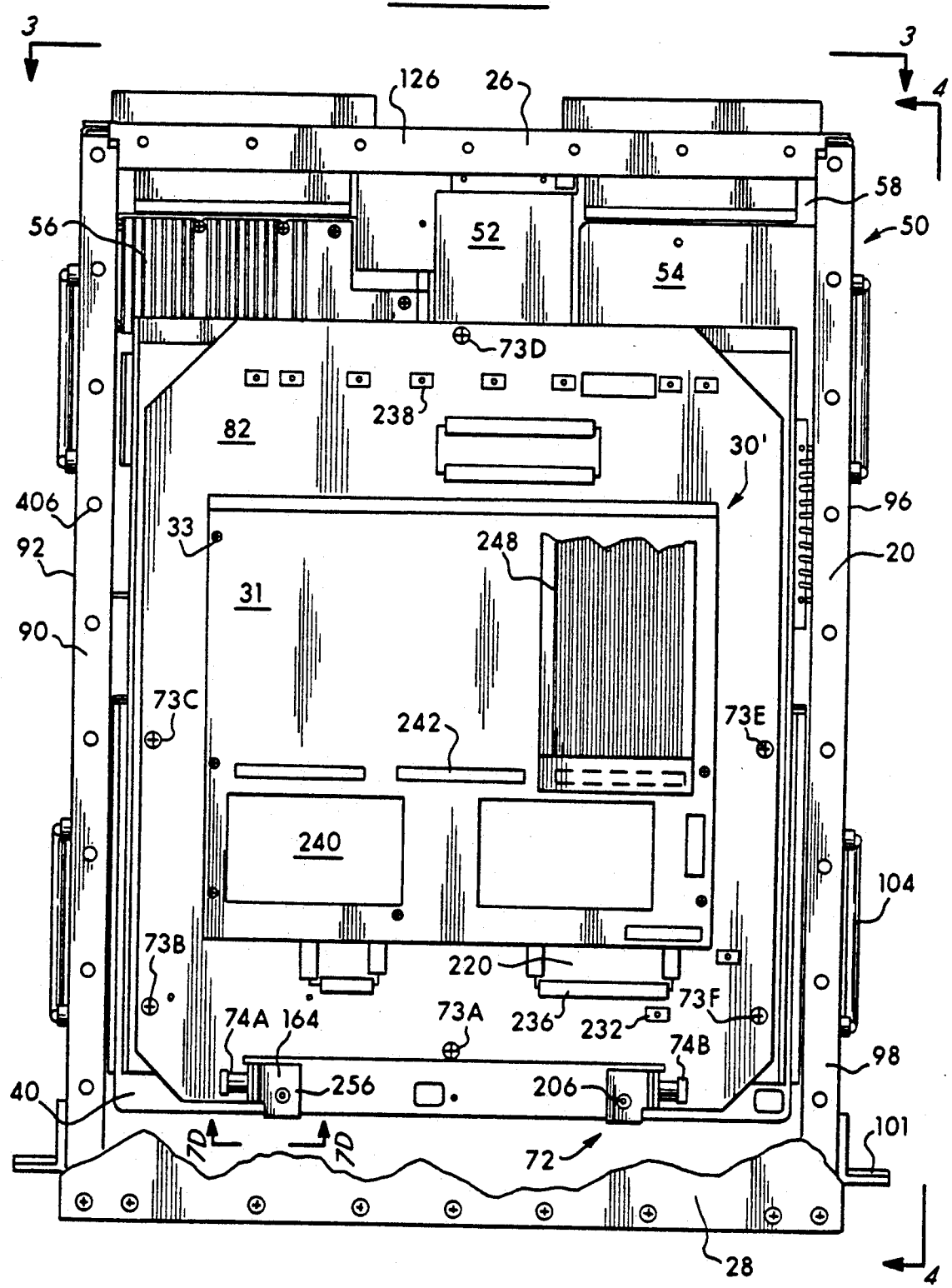
FIG. 2 is a top view of the ruggedized computer of FIG. 1, looked at in the direction shown by the lines 2—2 in FIG. 1, with the top panel cut away to show the arrangement of internal components, and including a second embodiment of a processor board.
Figure 3:
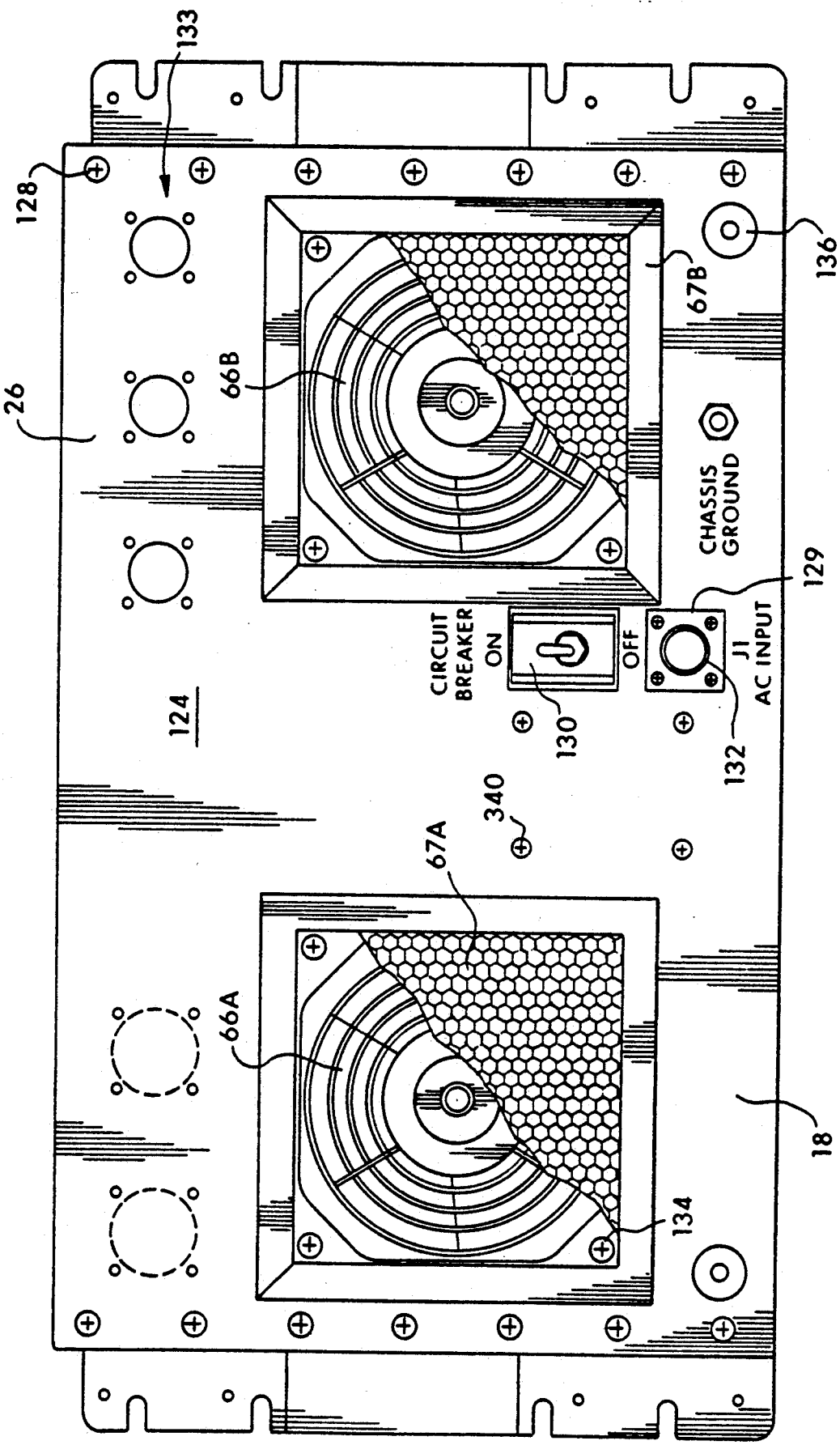
FIG. 3 is a rear view of the ruggedized microcomputer of FIG. 1, taken in the direction of the lines 3—3 in FIG. 2, with the electromagnetic screening partially cut away to show the fans.
Figure 4:
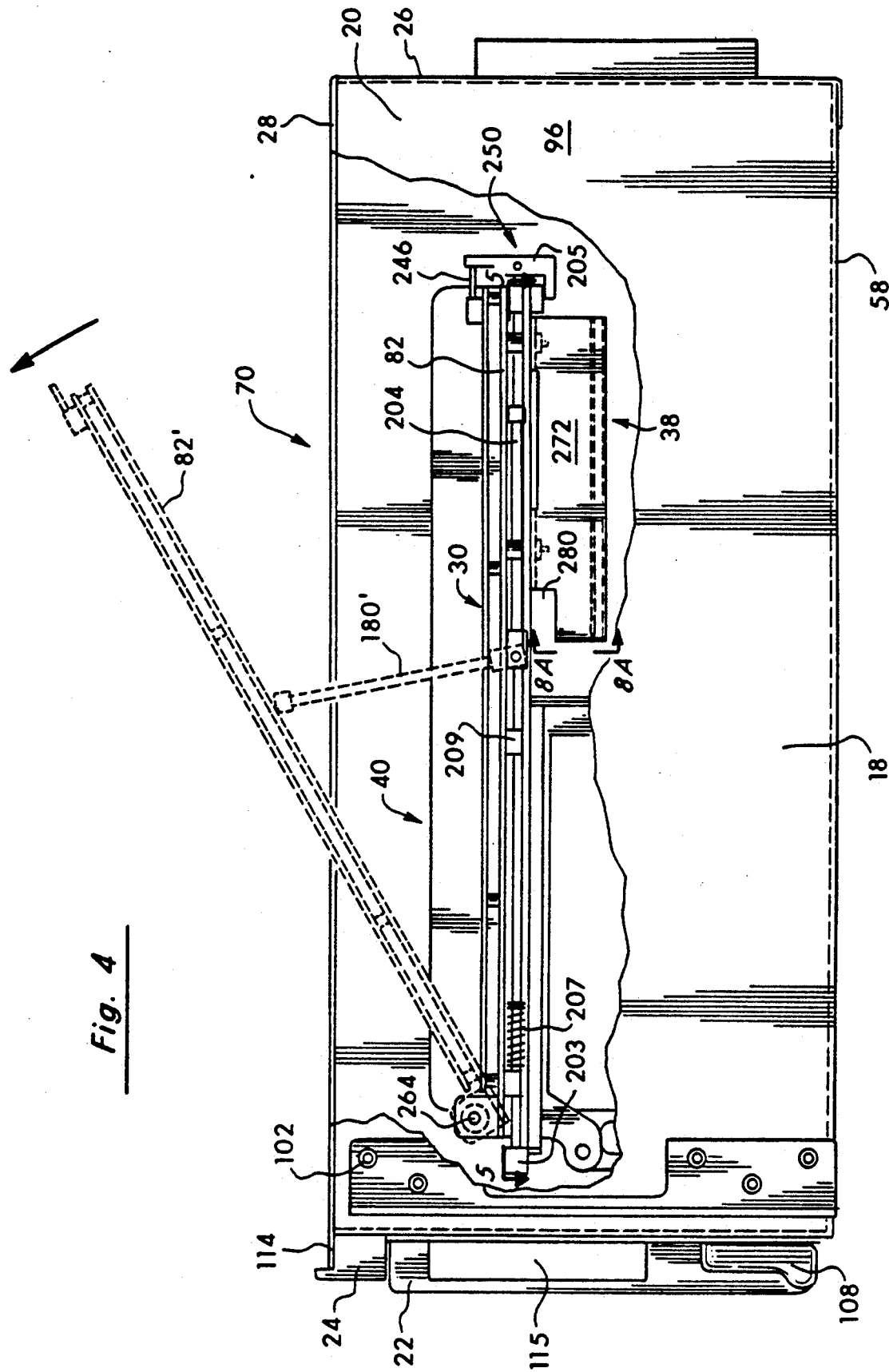
FIG. 4, is a side view of the microcomputer of FIG. 1, taken in the direction 4—4 in FIG. 2, with the side panel of the housing partially cut away to show internal components and with the second position of the first electronic unit shown in ghost.
Figure 5:
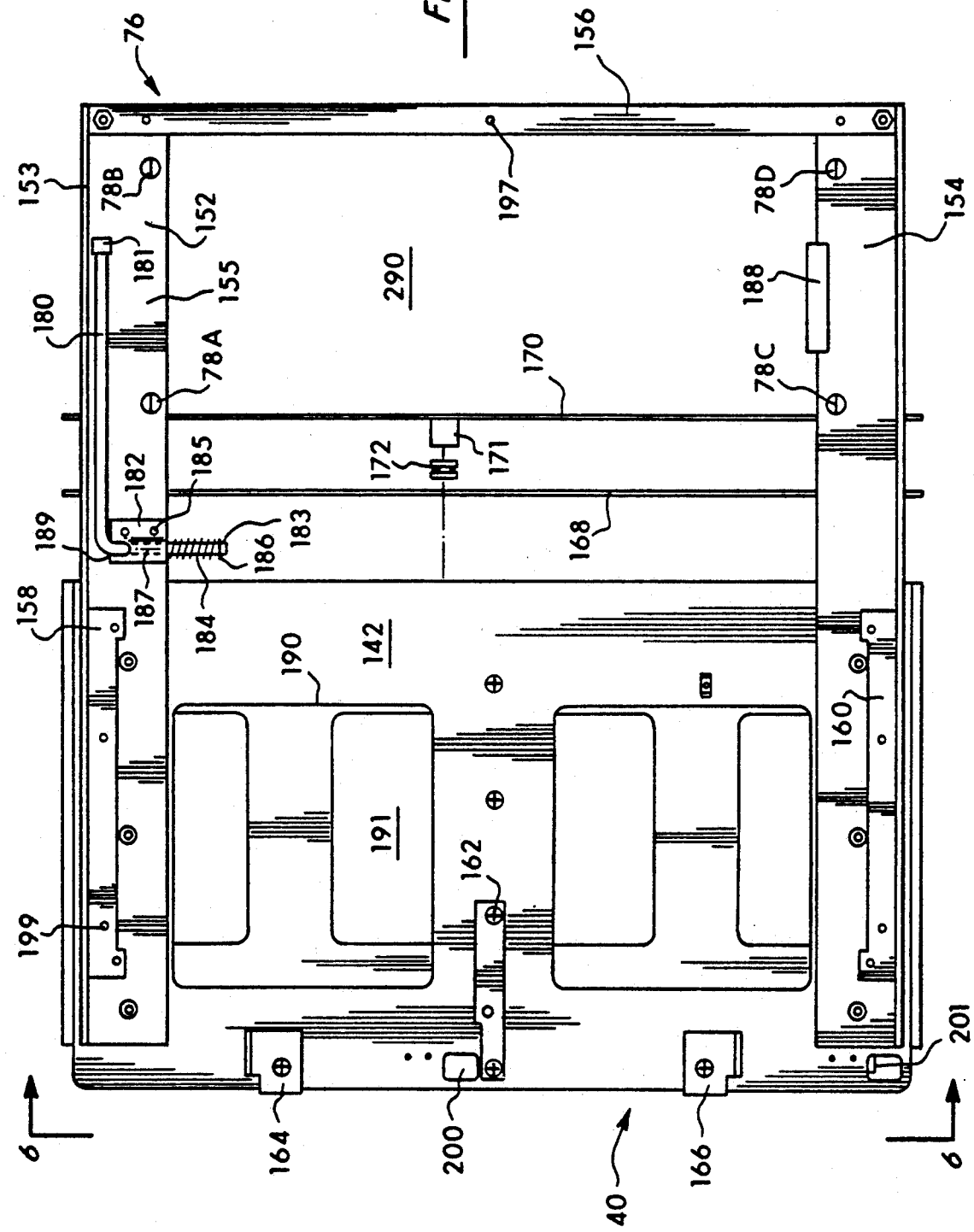
FIG. 5 is a partially exploded top view of the electronics mounting frame of the microcomputer of FIG. 1 taken in the direction of the lines 5—5 in FIG. 4.
Figure 6:
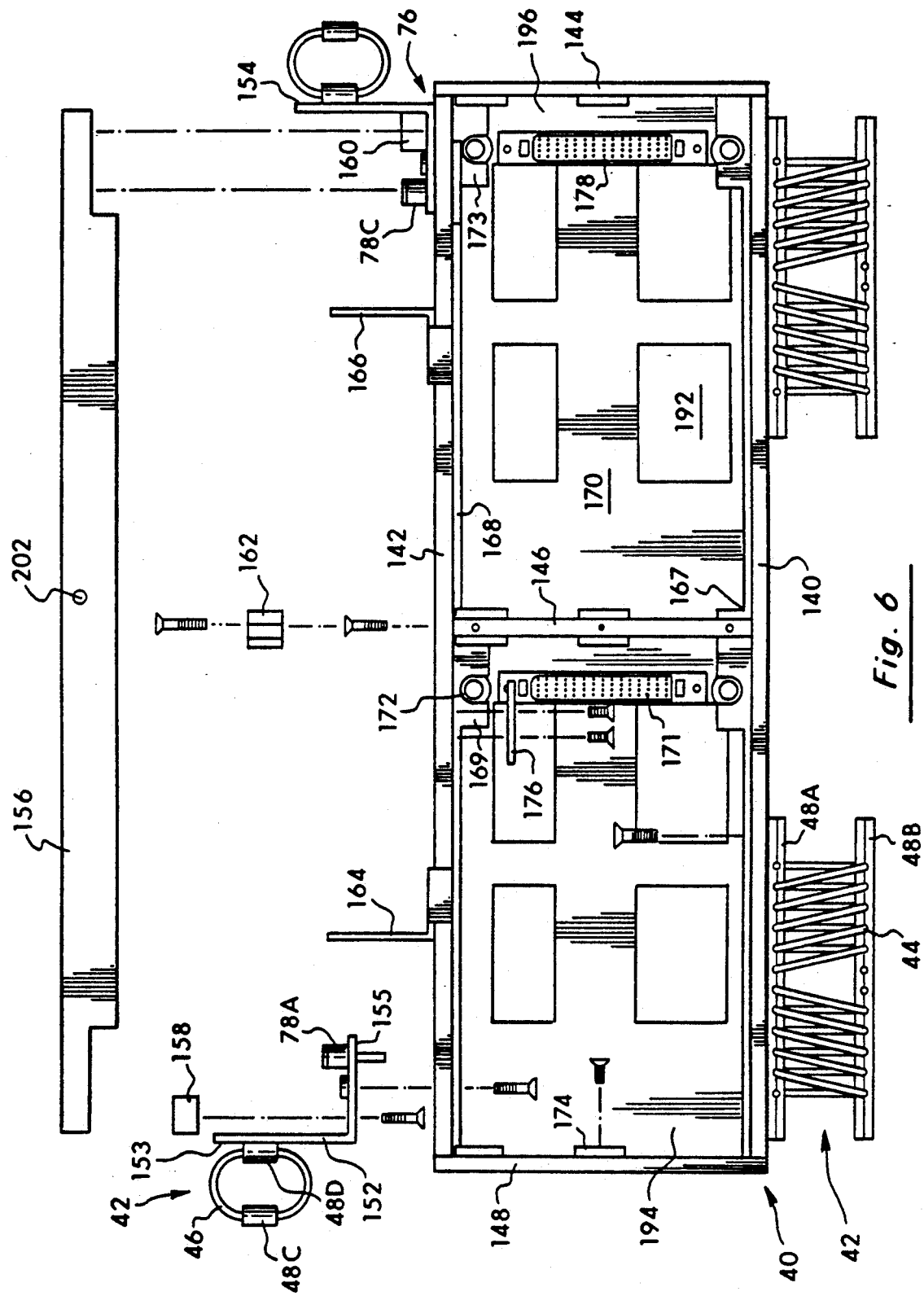
FIG. 6 is a front view of the electronics mounting frame, taken along the direction shown by the lines 6—6 in FIG. 5, and partially exploded to more clearly show its component parts.

Turning now to FIGS. 1 through 4, four partially cut-away views of a preferred embodiment of a ruggedized microcomputer 16 according to the invention are shown. Note that FIGS. 1,3, and 4 show one embodiment of a processor unit 30 having a processor board 32, while FIG. 2 shows a second embodiment of a processor unit 30' having a processor board 31. The microcomputer 16 includes a housing 18 comprising a u-shaped shell 20 (FIGS. 1 and 2), a removable front panel 22, best seen in FIG. 1, a control/display panel assembly 24 mounted above the front panel 22, a removable rear panel assembly 26, best seen in FIG. 3, and a removable top cover 28, best seen in FIG. 2. The most sensitive electronics of the microcomputer, such as the processor electronics unit 30 having a processor board 32 (or, in FIG. 2, the processor electronics unit 30' having a processor board 31), the memory electronics canister unit 34 including a tape drive 36 (FIG. 1), and the controller electronics unit 38 (FIG. 4) including a controller circuit board 39 (FIG. 8A) are supported within the housing 18 on an electronics mounting frame 40, which is shown in FIGS. 5 & 6 without the electronics. Frame 40 includes shock isolating means 42 (FIGS. 1 and 6) for isolating the electronic units 30, 34, and 38 from shock. In the preferred embodiment the shock isolating means 42 comprises stranded wire rope isolators 44 and 46 (FIG. 6) wound through mounting bars 48A and 48B, and 48C and 48D, respectively. The microcomputer supply 50 (FIG. 2) comprises a power input and filter module 52, a rectifier module 54 and a dc-to-dc converter module 56, each of which are mounted to the floor 58 of housing 18 via specialized assemblies which will be described below. The front panel 22 (FIG. 1) encloses electromagnetic and dust particle filters 60. A baffle means 62 for directing air through the electronic assembly 64 is mounted in the housing 18 directly behind the front panel 22. Fans 66A and 66B, mounted on rear panel assembly 26 (FIG. 3) force air through housing 18. Emi/rfi filters 67A and 67B cover the fan openings.

In this specification the term electronic unit means an electronic or electrical module that contains a plurality of electronic and/or electrical components mounted on circuit board or other support so that all the components can be removed or replaced as a unit. Thus, power supply modules 52, 54, and 56 are included in the term electronic unit as well as the other more obvious uses of the term, such as in reference to electronic units 30, 38 and 36. The term electronic assembly is a broader term that can include an electrical component, an electrical component and its support structure, an electronic unit, an electronic unit and its support structure, a plurality of electronic units, or a plurality of electronic units and their support structure.

Turning now to a more detailed description of the invention, we return to FIGS. 1 through 4. As mentioned above, the housing 18 comprises a U-shaped shell 20, a removable front panel 22, a control/display panel assembly 24 mounted above the front panel 22, a removable rear panel assembly 26, and a removable top cover 28. The housing, as we shall see below, is constructed to facilitate placing it in an equipment rack. Standard dimensions for equipment racks have been published by the Radio Electronics Television Manufacturing Association (RETMA) and are known as RETMA standards. Preferably, the shell 20, front panel 22, control/display panel 24, rear panel assembly 2, and top cover 28 are sized so that the housing 18 meets RETMA standards. U-shaped shell 20 has three solid sides, 92, 94 and 96 forming the left vertical side, the floor and the right side respectively. The three remaining open sides have flanges, such as flanges 90 and 98 on the top side (FIG. 2), which allow the top, front and rear panels to be attached to the shell 20 via screws, such as 99. A rack mount flange 101 (FIGS. 1 and 2) is attached to either side of shell 20 near the front by screws 102 and a telescoping slide (not shown) is attached to each side 92, 96 in the area of the cut away portion in FIG. 4, provide a means of securing the microcomputer 16 into an equipment rack. Four lift handles, such as 104 (FIG. 2), are attached to the sides 92 and 96 to facilitate transporting the microcomputer. A U-shaped reinforcing plate 106 is attached to the front flanges of shell 20 to provide a flat surface for the front panel assembly 22 to seal against and to support the front of the shell 20. A hinge block 108 (FIG. 4) is mounted to the reinforcing plate 106 at either side to allow the front panel assembly 22 to be easily removed. The sides 92, 96 also have suitable structure for mounting the internal components, which will be discussed below.

FIGS. 1 and 4 show the arrangement of the front panel 22 and the control panel 24. Control/display panel 24 is a separate assembly which provides an interface between the microcomputer 16 and the user. Cavities, such as 109, are formed in panel, and switches, such as 110 and indicators, such as 112, are mounted in the cavities. The switches and indicators are electrically connected to a circuit card (not shown) mounted to the rear of the panel 24. The circuit card is mounted in such a way as to ensure that the switches and indicators are flush or recessed to the front surface of the panel, as appropriate. Flat flanges, such as 114 (FIG. 4), are formed on the top, bottom and outer rear surfaces of panel 24 to allow the gaskets (not shown) of the top cover 28 and the front panel 22 and the surface of reinforcing plate 106 to seal tightly. The front panel 22 is a rectangular, hollow structure with cavities 115 (FIG. 4) formed on each side which serve as installation and removal handles when the microcomputer 16 is mounted in an equipment rack. A hinge pin (not shown) is formed in another cavity (not shown) on either side, which pin mounts in hinge block 108. The panel has a continuous groove (not shown) around its circumference for receiving a sealing gasket that compresses against the opposing surfaces upon closing the panel. Fasteners, such as 99, which remain captive when the front panel 22 is open pass through a continuous mounting flange 116 and secure the panel to housing shell 20. The hollow interior of front panel 22 contains an electromagnetic/radio frequency interference filter (not shown) and a woven, loose, air filter 118. These filters extend across the entire opening of the panel cavity to be sure that all cooling air passes through both filters. A slotted ventilation cover 120 is attached to the front panel 22 by captive fasteners, such as screw 122, and serves to retain the air filter 118. This feature allows the air filter 118 to be maintained or replaced without opening the front panel 22.

The rear panel assembly 26 comprises a flat panel 124 (FIG. 3) having a flange 126 (FIG. 2) on each of the top and bottom ends of the panel. The assembly 26 mounts on the housing shell 20 with screws, such as 128. The top flange 126 matches the height of shell flanges 90 and 98 and control/display assembly flange 114 to create a continuous surface for the top cover 28 to fasten to. Panel 124 has cutouts, such as 129, for standard and optional switches and ports, such as 130 and 132, and for cooling fans 66A and 66B. The fans are mounted on the interior of the panel 124 via screws, such as 134, and emi/rfi filter assemblies 67A and 67B are mounted over the fans 66A and 66B respectively by means of blind threaded inserts that pass through the panel 124 and are bolted inside. An alignment pin receptacle 136 is located at each of the two lower corners of the panel assembly 26, which receptacles allow the rear of the system to be held rigid when microcomputer 16 is mounted into an equipment rack. The rear panel 26 serves as the bulkhead for the external power source and the system input and output connectors 133.

2. The Electronics Mounting Assembly

FIG. 6 shows a front view of the electronics mounting frame 40 while a top view is shown in FIG. 5. The mounting frame 40 is partially exploded in each of these FIGS. to more clearly show its construction. Portions of frame 40 can also be seen in FIGS. 1, 2, and 4. This frame 40 forms a mounting platform for memory device canisters such as 34, for the processor electronics unit 30, and the optional controller electronics unit 38. The frame 40 is configured to be shock mounted within the housing shell 20 to provide shock isolation to the electronic components mounted on it. Any conventional shock mounting method may be used. In the preferred embodiment, stranded wire rope isolators, such as 44, are mounted between the bottom of the frame 40 and the housing shell 20 and other stranded wire rope isolators, such as 46, are mounted between the top of frame 40 and the shell sides 92 and 96. Mounting frame 40 comprises a bottom plate 140, top plate 142, end plates 144 and 148, center plate 146, angular supports 152 and 154, rear bar 156, processor tray spacer bars 158, 160, and 162, brackets 164 and 166, circuit card spacer bars 168 and 169, memory signal distribution circuit card 170 having connectors 171 and 178, four connector alignment bushings, such as 172, eight canister guides, such as 174, two cam lever plates, such as 176, support rod 180, support rod bracket 182, support rod spring 184, spring retainer 186, and cable protector 188. Top and bottom plates 142 and 140 have weight reduction holes, such as 190 and 191 respectively, formed in them, while circuit card 170 has ventilation holes, such as 192 formed in it. Plates 142 through 146 are fastened together to form the memory canister bays 194 and 196. guide rails 174 guide and support the memory canisters, such as 34 (FIG. 1), as they are inserted in the bays. The top plate 142 has a slot, such as 200, formed above each bay 194 and 196 and a cam lever plate, such as 176, attached at the front of the slot. When a canister is in the bay, the cam lever of the canister drops into the slot, such as at 201. The memory signal distribution card 170 forms the back of the canister bays 194 and 196. This card covers the full width of bays 194 and 196 and openings, such as 192, allow airflow to circulate through the mounting frame 40. Card 170 carries circuits which provide for all the power and signals that are required by memory device canister units, such as 34, through the single connector, 171 and 178, in each bay 194 and 196. Circuit card 170 is spaced slightly from the back of plates 140 through 146 by spacer bars 167 and 168. Each spacer bar has a pair of flanges, such as 169 and 173, extending toward the interior of the bays. A connector alignment bushing, such as 172 is mounted on each of these flanges. These bushings control alignment between the connectors 171 and 178 and the matting connectors (not shown) on the canisters by means of alignment pins located on the memory canisters. The canisters, such as 34, are conventional and will not be described in detail herein.

Figure 7B:
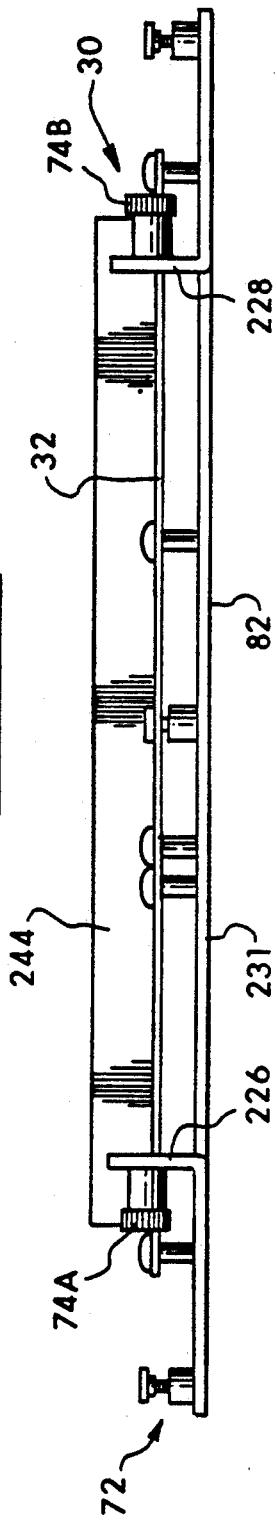
FIG. 7B is a front view of the processor tray of the embodiment of FIG. 1, taken in the direction of the lines 7B—7B in FIG. 7A, with circuit board mounted on it.
Figure 7C:
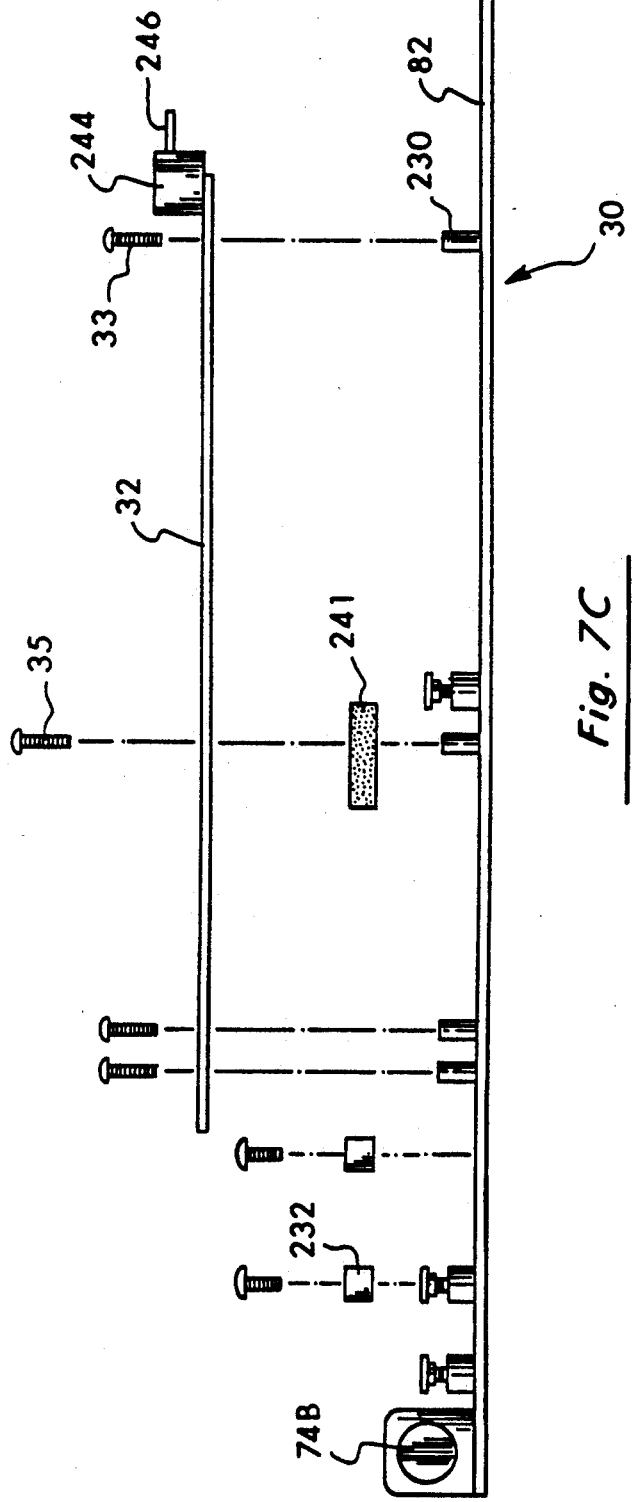
FIG. 7C is a side, partially-exploded view of the processor tray and circuit board embodiment of FIG. 1 taken in the direction of the lines 7C—7C of FIG. 7A.

Attached to the right and left sides of the mounting frame top plate 142 are angular supports 152 and 154. These angles each have a vertical member, such as 153, and a horizontal member, such as 155. As described earlier, these angles have mounting holes for fastening the upper shock isolators, such as 46. They also have threaded bores, such as 199, for receiving captive screws 73A through 73F of tray 82. A rear bar 156 is attached at the rear of the angles 152 and 154 to add rigidity. Bar 156 has a circular opening 202 which guides and support the reset mechanism rod 204 (FIG. 4), as will be discussed below. It also has one or more bores, 197, for receiving the captive screws, such as 73D of processor tray 82. In addition to supporting the isolators, angles 152 and 154 form a mounting rack for the processor electronic unit 30 and the controller electronic unit 38. The electronic unit 30 is mounted generally above and toward the forward end of the horizontal members 155, and the electronic unit 38 is mounted generally below and toward the rearward end of the horizontal member 155. This separates the units 30 and 38 from each other increasing cooling efficiency for both. It also provides mechanical separation of the units 30 and 38 which adds to the accessibility of each and the adaptability of the system as a whole. Spacer bars 158, 160 and 162 are attached to the angles 152 and 154 and top plate 142 respectively and provide a firm support for the processor tray 82 as well as spacing for the controller tray fasteners 78A through 78D. Fasteners 78A through 78D are held captive by the angles 152 and 154. Brackets 164 and 166 are attached to the forward edge of top plate 142 by screws, such as 206. These brackets each have a circular opening, such as 208 (FIG. 7E) which is the mounting and pivot point for the processor tray, as will be discussed in detail below. Processor electronic unit support rod 180 is a cylindrical rod formed into an L shape and having a groove 183 near the end of the shorter foot of the L. A plastic cap 181 is pressed onto the other end. Rod mounting bracket 182 is a rectangular block having a channel 187 through its length and a U-shaped notch at one end. The shorter foot of the L of the rod 180 is passed through channel 187 and the bracket 182 is attached to angle 152 by screws, such as 185. Spring 184 is placed over the end of the foot of rod 180 which extends beyond bracket 182, compressed, and retaining washer 186 is snapped into groove 183 to hold the spring 184 and rod 180 in place. Notch 189 is angled slightly toward the front of the frame 40 as it passes from the bottom of bracket 182 to the top of the bracket. When Rod 180 is raised to a point about 15 degrees past the vertical (FIG. 4), spring 184 pressing against retainer 183 causes the rod 180 to snap into notch 189 which locks the rod 180 in the upright position. The rod 180 may be lowered by pushing it to the left (toward the top of FIG. 5) so that it is free of notch 189 and laying it flat against angle 152. Cable protector 188 is snapped onto the edge of angle 154 to prevent electric cables from fraying. Such cable protectors may be placed wherever needed on frame 40.

A reset mechanism 250 is also carried by frame 40 in the embodiments shown in FIGS. 1 and 4. Reset mechanism 250 includes reset rod 204, knob 203 on the front end of the rod 204, reset actuator 205 attached to the distal end of the rod 204, and spring 207. Rod 204 passes through guides, such as 209 mounted on frame 40. Spring 207 is compressed slightly to push actuator 205 away from reset button 246. When knob at the front of the frame 40 is pulled, it pulls actuator 205 forward and the distal end of actuator 205 pushes the reset button 246.

Processor electronic unit 30 is shown in FIGS. 1, 2, 4, 7B and 7C. In FIG. 2 an embodiment is shown in which the processor board is smaller than the embodiment in the other FIGS. In this embodiment the board 31 is shown with many typical electronic components mounted on it. In the other FIGS., most of the electronic components are not shown for clarity, since their precise description plays no essential role in the discussion of the invention. Processor electronic unit 30 includes the circuit board 31 or 32 and processor tray 82. The processor tray is shown in FIG. 7A with the position of the circuit board 31 of the embodiment of FIG. 2 shown in ghost. In the preferred embodiments shown, processor tray 82 is a roughly rectangular plate about 14 inches wide, 16.5 inches long, and ⅛ inches thick. It has four rectangular slots, such as 220, which permit electrical cables to pass through the tray 82. Its corners, such as at 222 are cut off to save weight. A long notch 224 is formed in one end to allow for the means 72 for releasing and attaching the electronic unit 30 to mounting frame 40. At either end of notch 224 the tray material is turn up to form brackets 226 and 228. Brackets 226 and 228 are about ¾ inches wide and ⅛ inches thick and extend about 1 inch from the bottom surface 231 of tray 82. Each bracket 226 and 228 has a circular opening, such as 229, formed in it, approximately centered. Spring-loaded plungers 74A and 74 B are pressed into these openings 229. Tray 82 also includes captive fasteners 73A through 73F, six circuit board standoffs, such as 230, and two cable ties, such as 232. Captive fasteners 73A through 73F are preferably screws with knurled heads that can be tightened by hand. Standoffs 230 are preferably ⅜ inch long by 3/16 inches in diameter and are pressed through approximately 3/16 inch holes in tray 82. In the embodiment of the circuit board 32 of FIGS. 1, 4, 7B and 7C, a connector 244 having a reset button 246 is represented generally. Additional exemplary, though conventional, parts that may form part of a typical processor electronics unit are represented in the embodiment of the board 31 FIG. 2. These include cable protectors, such as 236, snapped over the edge of openings in tray 82, additional cable ties, such as 238, and on circuit board 31: chip packages such as 240, cable connectors, such as 242, and a conventional electrical connection means 248, such as a ribbon cable, twisted pair, or other connector. Since these parts are conventional, they are indicated generally rather than showing specific structure. In addition, a processor board may have insulating foam pads, such as 241 (FIG. 7C), to be placed between certain parts of the circuit and tray 82. Circuit boards 31 and 32 are attached to tray 82 (FIG. 7C) by placing the foam pads 241 over appropriate standoffs or in other areas beneath the board, aligning holes in the board with the standoffs such as 230 and passing screws, such as 33 through the circuit board and screwing them into the bores of their respective standoffs 230. The standoffs 230 cause the processor boards 31 and 32 to be mounted a fixed distance, preferably about 0.25 inches, above the surface of tray 82 so that cooling air is able to flow over the circuits on the top and bottom of the boards.

A detail of the quick release mechanism for attaching and removing the processor unit 30 is shown in FIGS. 7D and 7E. Bracket 164 is L-shaped and includes a post 254, a foot 256 and a flange 258. Bracket 164 is made of material about 0.1 inches thick. Post 164 is about ⅜ inches wide and 1.5 inches high, including the thickness of foot 256, and has a 0.25 inch hole centered between the sides and about 0.25 inches from the top of the post. Foot 256 is about 1 inch long, including the thickness of post 254, and about 0.75 inches wide. Flange 258 is about 0.75 inches wide, extends about 0.25 inches from foot 256, then curves smoothly in a right angle and drops about 0.25 inches to form a lip that engages top plate 142 of frame 40. Foot 256 has a counter-bored ¼ inch 256 and about ⅜ inches from the back edge of the foot; this hole receives a screw 206 to attach the bracket to top plate 142 of frame 40. Bracket 166 is similar except a mirror image. The details of bracket 226 and plunger 74A are described above. Brackets 164 and 166 are positioned on plate 142 so that the posts, such as 254, are parallel to a line extending from front to rear and so that the outer surfaces of the posts are about 8.25 inches apart, which is a distance which permits the inner surfaces of brackets 226 and 228 to be flush with the outer surfaces of the brackets 164 and 166 respectively. The plunger 74A is designed so that the end of pin 264 is flush with the inner surface of bracket 226 when it is fully retracted. This allows the brackets 226 and 228 to be engaged or disengaged with the brackets 164 and 166 respectively with no interference from the pin 264 and the corresponding pin on plunger 74B. When the brackets are engaged with hole 208 aligned with pin 264, and similarly with the other set of brackets 228 and 166, and the plungers 74A and 74B are released, the pins, such as 264 pass through the holes, such as 208, pivotally attaching one end of processor unit 30 to frame 40. The processor electronic unit may be immovably attached to frame 40 by pivoting it on brackets 164 and 166 so that its lower surface lays against spacers 158, 160 and 162, and screwing captive fasteners 73A through 73F into bores 199, 197 in angles 152 and 154 and rear bar 156 of frame 40.

The arrangement of the brackets 226 and 228, the approximate dimensions of the tray 82, and the position of the captive fasteners, 73A through 73F, will be a constant for various microcomputer processors. However, the arrangement of the standoffs 230, the cable access openings 220, and cable connectors 232 may be different on trays designed for different processors. The precise number of captive fasteners 73A through 73F may change also as some processor trays may require more than others. This allows trays with different processors on them to be mounted on identical frames 40 and in identical housings 18. This permits the processor to be a variable option with the ruggedized microcomputer according to the invention.

The preferred embodiment of a controller electronics unit 38 is shown in FIGS. 4, 8A and 8B. In these figures the various components that would be mounted on the circuit board, except electrical connection means 285, are not shown for clarity. Unit 38 comprises a tray 270 and a circuit board 39. Tray 270 is rectangular and has a pair of rectangular sides 272 and 274 and four mounting flanges 275, 276, 277, and 278. Each of sides 272 and 274 has a notch,, such as 280 (FIG. 4) cut in its forward edge. Flanges 275 through 278 each have threaded bores 278A through 278D respectively centrally located in it. Tray 270 is of a size so that it fits easily under but spans the distance between angles 152 and 154 with captive screws 78A through 78d fitting into bores 278A through 278D respectively. Circuit board 39 may be any convenient size to carry the necessary electronics; in the preferred embodiment it nearly spans the tray 270 in the long direction and spans it in the other direction. As in the case of the processor unit 30, standoff inserts, such as 282, and screws 286, are used to attach the circuit board 39 to tray 270. Washers, such as 284 may be also employed in attaching the circuit boards 31, 32 and 39 to trays 82 and 270 respectively. Conventional electrical connection means 285, such as a ribbon cable, twisted pair, etc. are used to connect the circuit board to other electrical circuits in the microcomputer 16. Cable protectors, such as 288, may be snapped to any of the edges of the tray 270 as needed. As indicated above, controller electronics unit 38 is attached to frame 40 by sliding it through the gap 290 between angles 152 and 154, card 170, and rear bar 156, placing the ends under angles 152 and 154 so that the bores 278A through 278D align with fasteners 78A through 78D, and screwing the fasteners into the bores.

3. The Power Supply

Figure 9:
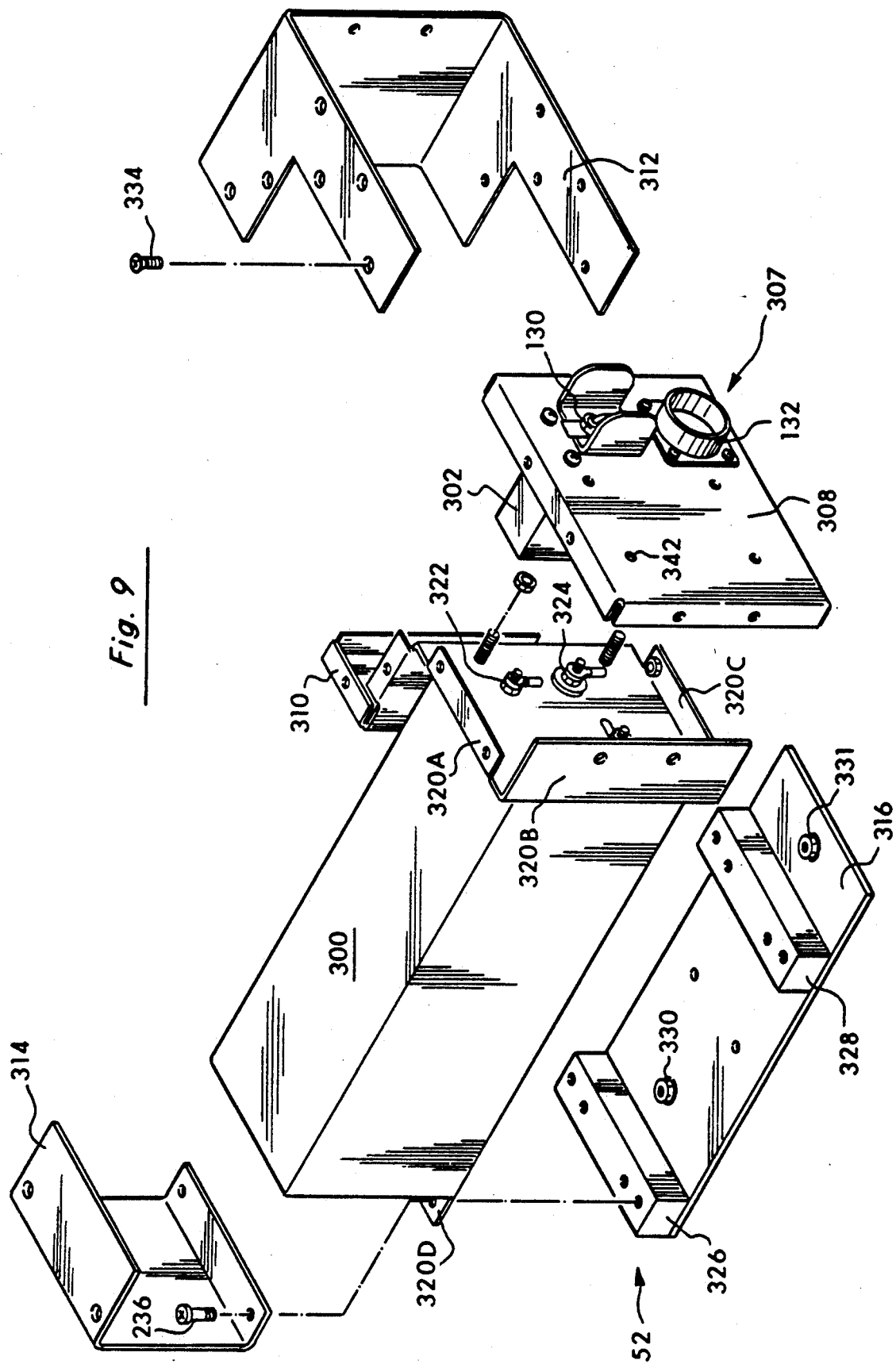
FIG. 9 is a partially exploded perspective view of the power inlet module of the ruggedized microcomputer of FIG. 1.

The power inlet and filter module 52 which provides the system interface to the external power source, is shown partially exploded in FIG. 9. It comprises EMI line filter 300, circuit breaker 302, circuit breaker switch 130, power inlet port 132, circuit breaker housing 307 comprising rear cover 308, front cover 310 and enclosure frame 312, filter end cover 314, and base support plate 316. Rear cover 308 has the circuit breaker 302, circuit breaker switch 130 and the power inlet port 132 attached to it. Front cover 310 includes flanges 320A through 320D. The EMI filter 300 has power input studs 322 and 324, and power output studs (not shown) attached to it. Base support plate 316 includes spacers 326 and 328 and mounting inserts 330 and 331. Rear cover 308 is fastened to flange 320B of front cover 310, and the rear cover 308 and front cover are attached to enclosure frame 312 via screws such as 334. This forms a sealed housing about circuit breaker and power connector studs 322 and 324 containing any electromagnetic interference that may be brought in from the external power source. As a safety feature, a formed cover 314 attaches to the output end of line filter 300, to prevent contact with the power terminals (not shown). Screws, such as 236, mount the end cover 314 and flange 320 to the spacer 326 of the base plate 316. The complete filter module 52 is mounted in the microcomputer housing 18 via screws which pass though the floor of housing 18 into mounting inserts 330 and 331 and four screws, such as 340 (FIG. 3), which pass through the rear panel 26 into corresponding bores, such as 342 in rear cover 308. This assembly permits circuit breaker switch 130 to be accessed through the opening formed in rear panel 26 and a power cable to pass through the input port 132 to connect to studs 322 and 324. Cables on the filter output studs (not shown) connect to the rectifier module 54.

Rectifier module 54 is shown in FIGS. 2, 10A, and 10B. It comprises rectifier circuit card 350 (again the details of electrical components are not shown for clarity) and rectifier housing 351 comprising rectifier enclosure frame 352, top cover 354, base mounting plate 356, rear support bracket 358, standoffs, such as 360, screws, such as 362, and washers, such as 363. Enclosure 352 has a cable port 353 formed in one side and ventilation openings formed in the front side. The back side is open and is supported by bracket 358. This design permits cooling air to circulate over the electronics on the circuit board 360, and, in combination with the placement of the rectifier module 54 in the housing 18, it allows the fan 66A on the rear panel 26 to pull air directly over the rectifier electronics and to be pushed out of the system. As in the other electronics units, standoffs 360 space the circuit board 350 from the base plate 356. Top plate 354 and base plate 356 are connected to the enclosure and the circuit board 350 is connected to the base plate 356 with screws and washers, such as 362 and 363, and the whole unit is mounted in the housing 18 by means of screws passing through the housing floor 58 and screwing into mounting inserts, such as 366, in the base plate 356. The power cable from the filter module (not shown) connects to connectors (not show) on the circuit board 350 and cables from the circuit board connect to the dc-to-dc converter module 56.

Figure 11A:
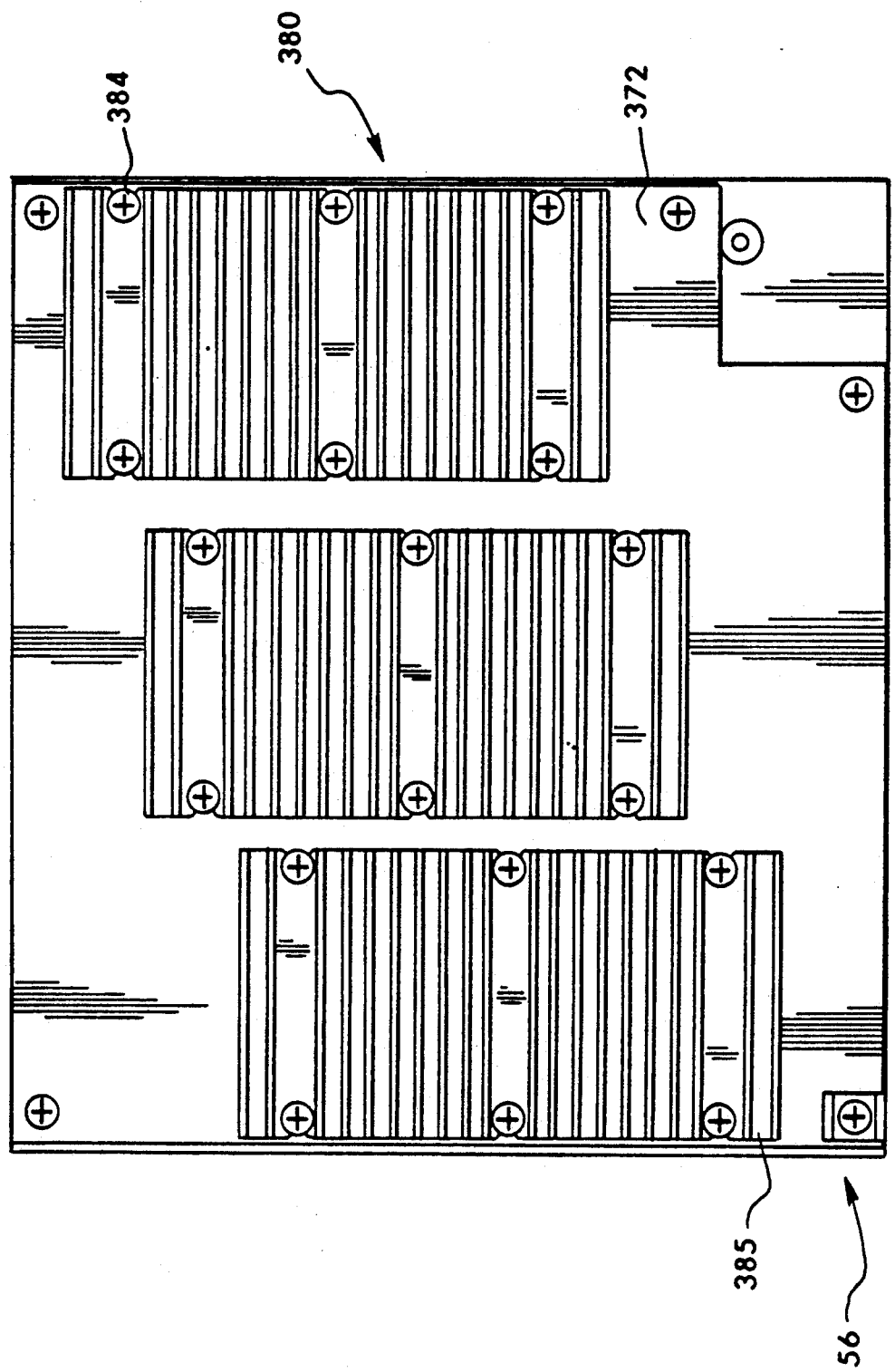
FIG. 11A is a top view of the dc-to-dc converter module of the microcomputer of FIG. 1.
Figure 11B:
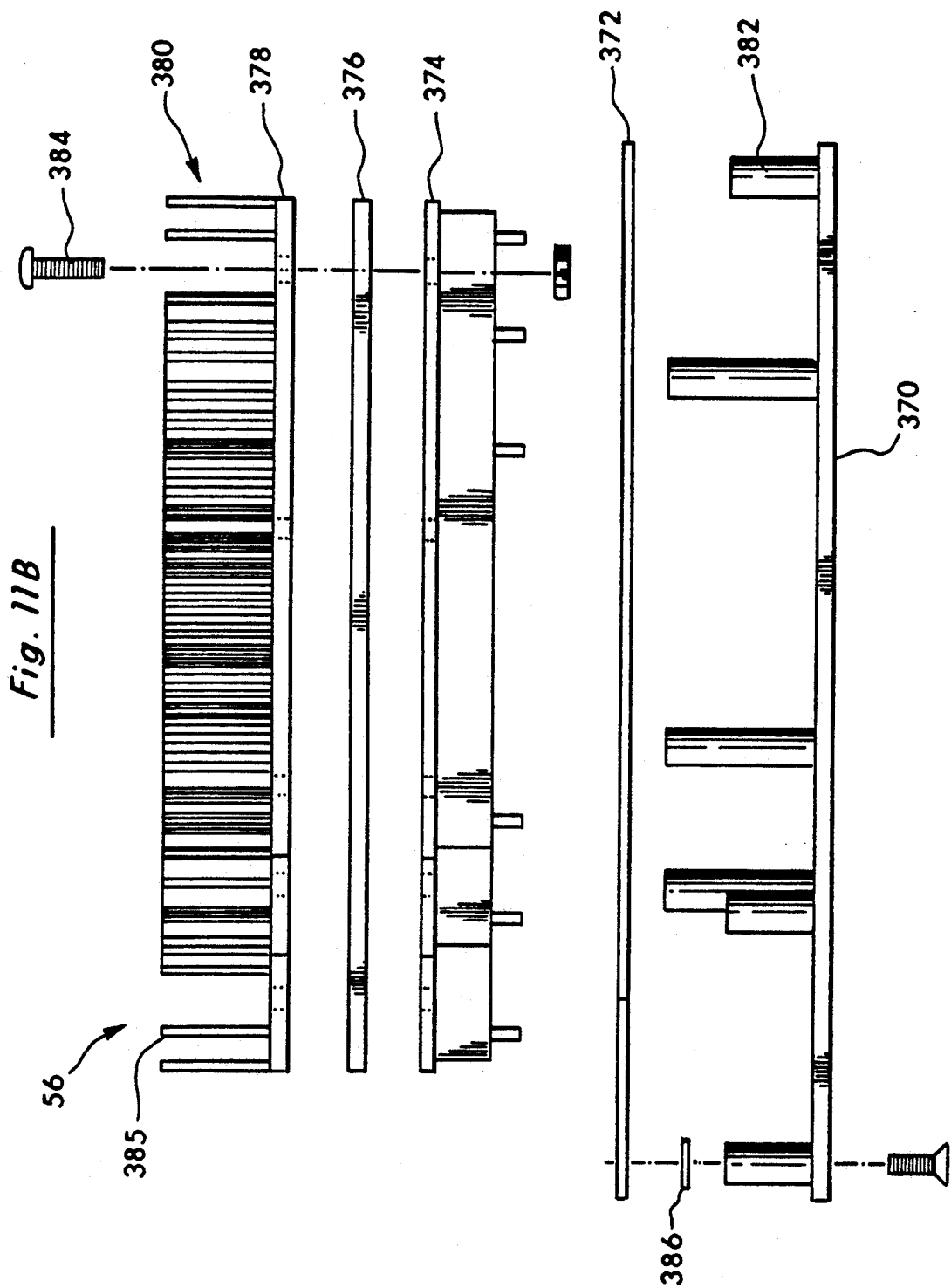
FIG. 11B is an exploded rear view of the dc-to-dc converter module of FIG. 11A.

A top view of dc-to-dc converter module 56 is shown in FIG. 11A and an exploded side view is shown in FIG. 11B. The assembly comprises base support plate 370, dc-to-dc circuit board 372, larger converter electronic components, such as 374, heat conducting spacer 376, top plate 378 having heat sinks 380 mounted on it, standoffs 382, screws 384, and washers 386. As before, the standoffs provide a fixed distance, preferably about 0.25 inches, between the circuit board 372 and base plate 370 for cooling air to pass, and also support the larger circuit components 374, spacers 376, and top plate 378 with heat sinks 380. The circuit card 372 has clearance holes (not shown) to pass the longer standoffs which support the other components. Again the base support plate 370 is attached to the floor 58 of housing 18 via screws and mounting inserts (not shown). The heat sinks 380 are arranged on the assembly to optimize cooling. The cooling fins 385 are positioned parallel to the stream of moving air to permit the air to flow between them. The converter module 56 is also arranged in the system so that cooling fan 66B is directly to the rear of the module and thus pulls air directly over the components and forces it from the microcomputer 16.

4. The Housing Extension.

Figure 12B:
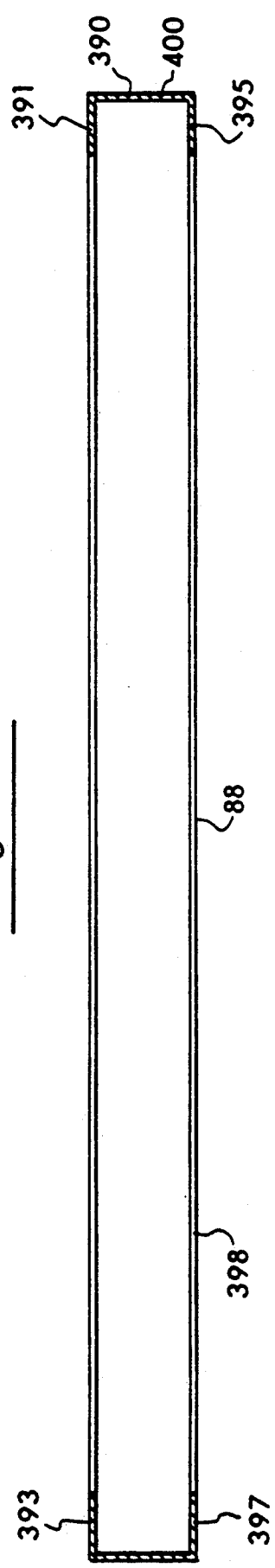
FIG. 12B is a cross-sectional view of the housing extension of FIG. 12A taken through the line 12B—12B in FIG. 12A.

The housing extension means 88 is shown in FIGS. 12A and 12B. Extension means 88 is an optional but important part of the invention. It comprises a frame 390 having four sides 400–403, four upper flanges 391 through 394 attached to sides 400 through 403 respectively, and four lower flanges 395 through 398 attached to the sides 400 to 403 respectively. As has been indicated above, the microcomputer housing 18 facilitates placing the microcomputer in an equipment rack. Preferably, the frame 390 is of a width that causes the extension to add a RETMA standard unit of height to housing 18; in the preferred embodiment the extension means 88 increases the housing size by one RETMA standard unit. The flanges 391 through 398 all have threaded bores, such as 404, formed in them, the positions of which correspond to the threaded bores in flanges 90 (FIG. 2), 126, 98, and 114 (FIG. 4) of the left housing side 92, back panel 26, right housing side 96, and control/display assembly 24 respectively. The extension means 88 is formed so that lower flanges 395, 396, 397, and 398 conform to the flanges 90, 126, 98, and 114. It a product specification calls for a processor that is so thick that it extends beyond the top of flanges 90, 126, 98, and 114, then extension means 88 is screwed to the top of these flanges and top cover 28 is then screwed to flanges 391 through 394. This allows processors requiring more headroom than that provided by housing 18 to be accommodated without requiring an entire different housing.

5. The Baffle

Figure 13A:
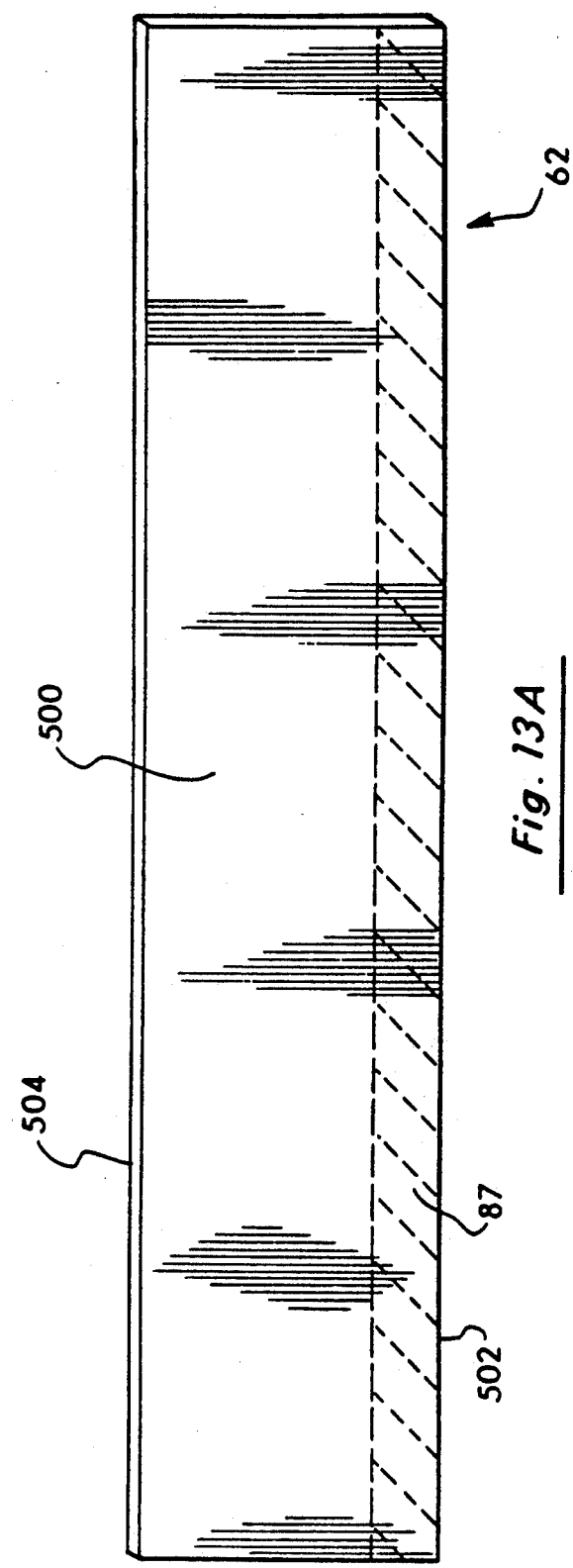
FIG. 13A is a perspective view of a baffle of the microcomputer of FIG. 1.

Baffle means 62 is shown in FIGS. 1, 13A, and 13B. It comprises a rectangular strip 500 of flexible material, preferably about 16.5 inches long by 4.5 inches wide, by 3/16 inches thick. A strip of adhesive 87 about 0.5 inches wide is formed along one end 502 of one of the long sides. The baffle strip 87 is installed in housing 18 by laying the strip 87 with end 502 along the lower front interior edge housing 18. Strip 87 is pressed against housing floor 58 fastening the strip 87 to the front edge of the floor. The upper end 504 is then raised and released so that it falls against the lower front edge 506 of frame 40. In this position the baffle means 62 forces the air to pass through the electronics mounted on the frame 40 rather than passing under the frame 40.

6. Composition of Parts

The housing shell 20, the front panel 22, rear panel plates 124, most of the frame 40 including plates 140, 142, 144, 146, and 148, brackets 164, 166, and 182, angles 152 and 154, spacers 158, 160 and 162, rear bar 156, spacer bars 168 and 169, the trays 82 and 270, extension 88, and the housing parts 308, 310, 312, 314, 316, 320A through 320C, 326, 328, 352, 354, 356, 358, 370, 376, 378, and 385 for the power supply modules 52, 54, and 56 are preferably made of aluminum alloy 5052-H32 or aluminum alloy 6061-T6 for larger parts requiring extensive machining. Plungers 74A and 74B are preferably Type PTL2 spring-loaded plunger assemblies available from Penn Engineering and Manufacturing Corporation, Danboro, Penna. 18916-1000 and are preferably made of heat-treated carbon steel. Rod 180, spring 184, and retainer 186 are preferably made of Series 303 stainless steel and cap 181 is preferably made of silicon rubber. Standoffs 230, 282, 360, and 382 are conventional standoffs, such as the stainless steel standoffs available from Promptus Electronics Hardware of Mount Vernon, N.Y. Cable ties 232 and 238 are conventional cable ties such as the nylon cable ties available from Panduit, Inc. of Tinley Park, Ill. The captive fasteners such as 73A through 73F and 78A through 78D are preferably conventional screw fasteners with large knurled heads that can be screwed by hand, such as the stainless steel captive fasteners made by Penn Engineering and Manufacturing Corporation, Danboro, Penna. 18916-1000. The screws, such as 35, 102, 122, 206, 236, 286, 362, and 384 are preferably made of stainless steel. Washers, such as 284, 363 and 386 are preferably stainless steel locking washer. Guides 174 are preferably made of DELRIN TM Plastic. Baffle strip 500 is preferably made of PORON TM cellular urethane such as that available from Rogers Corporation of East Woodstook, Conn. Adhesive 87 is preferably a strip of acrylic transfer tape Type No. 950 made by the 3M Company, Minneapolis, Minn. Other appropriate materials may be used. Components not described in detail above are conventional and are made of appropriate materials.

7. Function and Features

The invention functions as follows. When an order is received for a ruggedized microcomputer, a processor electronics unit 30 having the specified processor board 31, 32 or any one of various other embodiments is selected. A controller electronics unit 38 having an appropriate controller board 39 is also selected if required. A power supply line filter 300, rectifier circuit board 350, and dc-to-dc circuit board 372 and other dc-to-dc electronics 374 are selected to provide the power interface appropriate to the specified processor and external power sources. An input module 52, rectifier module 54, and dc-to-dc module 56 are assembled using these power supply cards and electronics. A memory signal distribution circuit board 170 appropriate for the specified memory is used when constructing a mounting frame 40, and the modules 52, 54, and 56 and frame 40 are assembled in a housing 18 together with a baffle 500, and specified control/display assembly 24. If a controller electronics unit is required it is inserted beneath the angles 152 and 154 and secured with fasteners 78A through 78D. The processor unit 30 is then connected to brackets 164 and 166 using plungers 74A and 74B and secured in place with fasteners 73A through 73F. It should be noted that laying tray 82 down above angles 152 and 154 traps rod 180 between the angle 152 and the bottom of tray 82. When fasteners 73A through 73F are fastened, rod 180 is secured so that it cannot come loose and do damage to electronics, even if housing 18 was subjected to shocks so severe that damage to the housing would occur. If more head room is needed, an extension means 88 may be added. Hard disks, tape drives, floppy disks and or cd-roms drives as specified are placed in one or two memory canister units 34 and the canister units 34 are placed in bays 194 and 196. A rear panel assembly 26, front panel assembly 24 and top cover 28 are added to complete the microcomputer. Electrical connections are made as appropriate during the above assembly.

If replacement of a part is required in the field, once the top cover 28 is removed, almost all electronic parts are readily accessible without making any electrical disconnections, and almost all electrical connectors are accessible if disconnection is necessary. The processor unit 30, which is the most important of the electronic parts, is immediately accessible upon removal of cover 28. If the problem is in the controller electronics unit 38, fasteners 73A through 73F may be unscrewed, the processor unit 30 pivoted about pins 264 in the direction of the arrow in FIG. 4 until tray 82 reaches the position indicated at 82', and rod 180 lifted to the position shown at 180 and locked in position using notch 189 to stably support the processor unit 30. This makes the controller electronics unit 38 accessible. If more room is need, plungers 74A and 74B may be retracted, and processor unit 30 may be lifted out. It is noted that the diagonal length of tray 82 between opposite corners is greater than the distance between flanges 90 and 98. Thus if the processor unit is lifted and rotated approximately 45 degrees, it may be stably rested on the flanges. Since the underside of tray 82 is solid metal, as well as the upper surface of the flanges, this can be done without risking damage to any electronic parts. If the electrical cables, such as 248, are long enough, this may be done without is disconnecting the power from the unit. This can be very helpful in attempting to find faults in the circuits. Controller unit 38 may be removed by unscrewing fasteners 78A through 78D and sliding unit 38 out from under angle 152 and 154. This provides access to the memory signal distribution board 170 and the power supply modules 52, 54, and 56. Since unit 38 spans angles 152 and 154 and is supported on a durable tray 270, it may be stably supported on the angles without risking damage to any electronic parts. This can be done without disconnecting the cables, such as 285, if desired. Further, unit 38 may be slid forward on angles 152 and 154 under tray 82', again without risking damage to any electronic parts, if greater access is desired to work on the power supply modules 52, 54, and 56. The memory canisters 34 and drives 36 are readily removable and replaceable by opening hinged front panel 22.

FIG. 13B illustrates how the baffle 500, the frame 40 and the housing 18 interact. When the frame 40 moves forward with respect to housing 18, the end 504 moves as shown by the ghost end 504'. When the frame 40 move backwards with respect to the housing 18, the end 504 moves as illustrated by the ghost end 504". Normally, of course, when shocks occur to the housing 18, it is the housing that moves while the frame 40 and the electronics it carries remain relatively motionless. Baffle 500 will slide on edge 506 of frame 40 and remain in contact with front edge 506 of frame 40 for upward and downward relative motions of frame 40 with respect to housing 18. Thus Baffle 500 will remain in contact with the front edge 506 of frame 40 for all relative motions of frame 40 with respect to housing 18 within the design specifications of the shock isolation system. Baffle 500 also will easily move out of the way if it is necessary to remove frame 40 or if it is necessary to access the underside of frame 40, as for instance if a part is dropped and it rolls under the frame 40.

The mounting frame 40 and power supply modules 52, 54, and 56 are arranged in housing 18 so that air is drawn in through filters 118, circulates through and around the memory units 36, over the processor electronic unit 30 and controller electronic unit 38, then over the power supply modules 52, 54, and 56 and is pushed out of the rear panel by fans 66A and 66B. The arrangement is such that the electronic units that produce the most heat are positioned nearest the rear panel exhaust fans. This arrangement is preferable so that the heated air of these units will not circulate over the cooler units.

A feature of the invention is that one electronic unit, e.g. the processor unit 30, is supported by first electronic unit support means 70 (FIG. 4) for permitting the first electronic unit 30 to be moved from a first position where it blocks the electronics unit 38, to a second position where the second unit 38 is accessible and for stably supporting the first unit in the first and second positions. As discussed above, this feature increases the accessibility, adaptability, compactness and durability of the microcomputer.

Another feature of the invention is that the support means 70 further includes release means 72, e.g. captive fasteners 73A through 73F and spring-loaded plungers 74A and 74B (FIG. 2), for attaching and releasing, the first electronic unit 30 from housing 18 by hand. A related feature is that the invention includes means 76, e.g. fasteners 78A through 78D (FIGS. 5 and 6), for releasably fastening second electronic unit 38 to frame 40 by hand, and that means 76 for releasably fastening is easily accessible when first electronic unit 30 is in the second position. These features also impact accessibility, adaptability, durability and compactness.

Another feature is that the invention includes electronic unit mounting means 80, e.g. processor tray 82 and means 72 for attaching and releasing it (FIG. 2), for permitting various electronic units of different sizes and manufacturing origins to be mounted in the housing. This feature combines with the above features to impact all their positive advantages.

The above features result in a ruggedized microcomputer that retains all the resistance to shock and vibration of previous ruggedized microcomputers, is even more compact that previous ruggedized microcomputers, yet the electronic components are easily accessible for repair. At the same time, the ease of removing the tray, and the fact that many different types of processors can be mounted on essentially the same tray, results in a ruggedized computer that is overall less expensive to manufacture.

Baffle means 62 adjacent electronic assembly 84, e.g. electronic mounting frame 40 and the electronics 30, 36, and 38 mounted on it, for directing air, is another feature of the invention. Baffle means 62 is sufficiently rigid to perform its directing function and sufficiently flexible to permit ease of accessibility to and replacement of the adjacent electronic assembly 84. The baffle means 62 is mounted in the housing 18 via means 86, e.g. adhesive 87, (FIGS. 13A and 13B) so that it contacts electronic assembly 84 without transmitting shocks from the housing 18 to the electronic assembly. The flexible baffle goes against the grain of the prior art idea that all parts had to be made stronger and thus stiffer in a ruggedized computer. The flexible baffle not only results in more efficient cooling, it permits the entire microcomputer to be more compact because the air can now be directed to them rather than have them spread out along the path of the air. At the same time all this is done at less cost since some of the multiple fans in prior art ruggedized microcomputers can be eliminated.

The invention also features housing extension means 88 (FIGS. 12A and 12B) for extending housing 18, adjacent electronic unit 30, by fastening it to the top of flange 90 (FIG. 2) so that electronic units requiring head rooms greater than that permitted by housing 18 alone can be mounted on mounting means 40 and enclosed within housing 18 and housing extension means 88 without requiring a completely different housing. A related feature of this extension means 88 is that all the other parts of the housing, such as shell 20 and top plate 28 can be used in the extended housing with no change or adjustment. Likewise, none of the electronic connections or attachments need to be changed.

A modular power supply 50 including power input and filter module 52, rectifier module 54, and a dc-to-dc converter module 56 is an additional feature allows the ruggedized microcomputer 16 according to the invention to be adapted to a wide variety of different specifications. It also reduces the overall cost of manufacturing since the power supply housing parts can be the same for many different models of the microcomputer.

There has been described a novel ruggedized microcomputer that provides for easy accessibility of its electronics and adaptability to a wide variety of processors and which has many other advantages. It should be understood that the particular embodiments shown in the drawings and described within this specification is for purposes of example and should not be construed to limit the invention which will be described in the claims below. Further, it is evident that those skilled in the art may now make numerous uses and modifications of the specific embodiment described, without departing from the inventive concepts. For example, now that it is seen to be possible to build a ruggedized microcomputer in which the electronics is easily accessible without electrically disconnecting the components, other means for providing this accessibility may be devise. Or the various parts described may be made with a wide variety of dimensions and materials. A greater or lesser number of parts may be used. Consequently, the invention is to be construed as embracing each and every novel feature and novel combination of features present in and/or possessed by the ruggedized microcomputer described.

What is claimed is:

1. A ruggedized microcomputer system comprising:
   a source of electrical power;
   a first electronic unit and a second electronic unit;
   a housing completely enclosing said first electronic unit and said second electronic unit;
   shock isolating means for isolating said first and second electronic units from shocks to said housing;
   first electronic unit support means for permitting said first electronic unit to be moved from a first position where it blocks the accessibility of said second unit to a second position where said second unit is accessible and for stably supporting said first unit in said first and second positions, said support means comprising rod means for supporting said first electronic unit in said second position, and preventing means for preventing said rod means from moving with respect to said electronic unit when said first electronic unit is in said first position and shocks are applied to said housing; and
   electrical connecting means connecting said first electronic means to said source of power in said first and second positions and connecting said second electronic means to said source of power.

2. A ruggedized microcomputer system as in claim 1 wherein said support means further includes release means for attaching and releasing said first electronic unit from said housing by hand.

3. A ruggedized microcomputer system as in claim 2 wherein:
   said first electronic unit support means comprises a frame;
   said release means comprises means for releasably attaching said first electronic unit to said frame; and
   said shock isolating means comprises shock absorbing means for attaching said frame to said housing.

4. A ruggedized microcomputer system as in claim 3 wherein said support means comprises pivot means for permitting said first electronic unit to pivot about one end.

5. A ruggedized microcomputer system as in claim 2 wherein said release means comprises a spring-loaded plunger.

6. A ruggedized microcomputer system as in claim 5 wherein said support means further comprises receptacle means for pivotally receiving said plunger, said receptacle means and plunger located at or near one portion of said first electronic unit, and said release means further comprises means for attaching another portion of said first electronic unit to said frame by hand.

7. A ruggedized microcomputer system as in claim 1 wherein said first electronic unit support means comprises a frame and said shock isolating means comprises shock absorbing means for attaching said frame to said housing, said preventing means comprises said frame and said first electronic unit, and said rod means comprises: a rod, and means pivotally attaching one end of said rod to said frame permitting it to move from a down position in which it is trapped between said first electronic unit and said frame and an up position in which it supports said first electronic unit in said second position; and locking means for locking said rod in said up position.

8. A ruggedized microcomputer comprising:
   a housing;
   an electronic assembly in said housing;
   shock isolating means for supporting said electronic assembly within said housing while isolating said assembly from shocks to said housing;
   fan means for moving air through said housing;
   baffle means for directing said air, said baffle means comprises a member that is sufficiently flexible to contact both said housing and said electronic assembly without transmitting shocks from said housing to said electronic assembly; and
   means for mounting said baffle means in said housing in contact with said electronic assembly.

9. A ruggedized microcomputer system as in claim 8 wherein said baffle means is made of cellular urethane.

10. A ruggedized microcomputer system as in claim 8 wherein said baffle means loosely contacts one of said housing or said electronic assembly.

11. A ruggedized microcomputer system as in claim 10 wherein said baffle means is attached to the other of said housing and said electronic assembly.

12. A ruggedized microcomputer system as in claim 11 wherein said mounting means comprises adhesive.

13. A ruggedized microcomputer system comprising: housing;
- a frame including a forward portion comprising a housing for memory units and a pair of angles extending rearwardly from said forward portion, said angles each having a vertical member and a horizontal member;
- shock isolating means for attaching said frame to said housing while isolating it from shocks to said housing, at least a portion of said shock isolating means being attached to said vertical members;
- a first circuit board and a second circuit board, each having an electronic circuit mounted on it;
- a first rigid tray and a second rigid tray, said first circuit board being mounted on said first tray and said second circuit board mounted on said second tray; and
- means for attaching said trays to said frame with at least one of said trays being attached to said horizontal members of said angles and with said first tray being located above said horizontal members of said angles and said second tray being located below said horizontal members of said angles.

14. A ruggedized microcomputer as in claim 13 wherein each of said angles has an end distal from said forward portion of said frame, and said second tray is attached to said distal end of said angles.

* * * * *